United States Patent
Sun et al.

(10) Patent No.: US 11,240,085 B2
(45) Date of Patent: Feb. 1, 2022

(54) METHODS FOR ENB, UE UPLINK TRANSMISSION AND RECEPTION

(71) Applicant: HFI INNOVATION INC., Zhubei (TW)

(72) Inventors: Feifei Sun, Beijing (CN); Xiangyang Zhuang, Lake Zurich, IL (US)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 16/815,214

(22) Filed: Mar. 11, 2020

(65) Prior Publication Data
US 2020/0213173 A1 Jul. 2, 2020

Related U.S. Application Data

(60) Division of application No. 15/321,783, filed as application No. PCT/CN2015/083807 on Jul. 10, (Continued)

(51) Int. Cl.
*H04W 72/12* (2009.01)
*H04L 27/26* (2006.01)
(Continued)

(52) U.S. Cl.
CPC ........ *H04L 27/2636* (2013.01); *H04L 1/1854* (2013.01); *H04L 5/0007* (2013.01);
(Continued)

(58) Field of Classification Search
CPC ... H04L 5/0053; H04L 5/0007; H04L 1/1854; H04L 5/0012; H04W 72/0406; H04W 72/0453; H04W 72/02
See application file for complete search history.

(56) References Cited

U.S. PATENT DOCUMENTS 9,370,021 B2 6/2016 Love et al.
10,433,282 B2 10/2019 Montojo et al.
(Continued)

FOREIGN PATENT DOCUMENTS

CN 101779512 A 7/2010
CN 102106178 A 6/2011
(Continued)

OTHER PUBLICATIONS

International Search Report dated Sep. 30, 2015, issued in application No. PCT/CN2015/083814.
(Continued)

*Primary Examiner* — Fahmida S Chowdhury
(74) *Attorney, Agent, or Firm* — McClure, Qualey & Rodack, LLP

(57) ABSTRACT

Methods and apparatus are provided for narrowband UEs. In one novel aspect, frequency hopping is used. The UE stays on the first frequency band for consecutive number of subframes before hopping to another frequency band. In another embodiment, the first set of resource elements and the second set of resource elements are discontinued with a gap in the time domain. In another novel aspect, the UE obtains sub-band information and a resource index and generates a communication channel for data frame transmission and receiving. In one embodiment, the UE further acquires the sub-band set information through system information. In yet another embodiment, the resource index is acquired from DCI. In yet another novel aspect, resource blocks are selected for a PUCCH for a narrowband UE. The UE determines an operating sub-band information and selects one or more narrowband regions for the PUCCH.

10 Claims, 21 Drawing Sheets

Related U.S. Application Data 2015, now abandoned, which is a continuation-in-part of application No. PCT/CN2014/082096, filed on Jul. 11, 2014.

(51) Int. Cl.

| | | |
|---|---|---|
| *H04L 5/00* | (2006.01) | |
| *H04W 72/02* | (2009.01) | |
| *H04W 72/04* | (2009.01) | |
| *H04W 76/27* | (2018.01) | |
| *H04L 1/18* | (2006.01) | |
| *H04W 74/08* | (2009.01) | |

(52) U.S. Cl.
CPC .......... *H04L 5/0012* (2013.01); *H04L 5/0028* (2013.01); *H04L 5/0048* (2013.01); *H04L 27/2607* (2013.01); *H04W 72/02* (2013.01); *H04W 72/042* (2013.01); *H04W 72/0406* (2013.01); *H04W 72/0413* (2013.01); *H04W 72/0446* (2013.01); *H04W 72/0453* (2013.01); *H04W 72/1263* (2013.01); *H04W 74/0808* (2013.01); *H04W 76/27* (2018.02); *H04L 1/1812* (2013.01); *H04L 5/0044* (2013.01); *H04L 5/0053* (2013.01)

(56) References Cited

U.S. PATENT DOCUMENTS

| | | |
|---|---|---|
| 2007/0159959 A1 | 7/2007 | Song et al. |
| 2009/0318175 A1 | 12/2009 | Sandberg |
| 2010/0329384 A1* | 12/2010 | Kwak .................. H04L 5/0044 375/295 |
| 2011/0044188 A1 | 2/2011 | Luo et al. |
| 2011/0134747 A1 | 6/2011 | Kwon et al. |
| 2011/0164698 A1 | 7/2011 | Wu |
| 2011/0171985 A1 | 7/2011 | Papasakellariou et al. |
| 2011/0205999 A1 | 8/2011 | Yu et al. |
| 2011/0274040 A1 | 11/2011 | Pani et al. |
| 2011/0274060 A1 | 11/2011 | Luo et al. |
| 2011/0317624 A1 | 12/2011 | Luo et al. |
| 2012/0287882 A1 | 11/2012 | Kim et al. |
| 2013/0064119 A1* | 3/2013 | Montojo ........... H04W 72/0453 370/252 |
| 2013/0070726 A1 | 3/2013 | Zhang et al. |
| 2013/0188563 A1 | 7/2013 | Kim et al. |
| 2013/0242882 A1 | 9/2013 | Blankenship et al. |
| 2013/0272229 A1 | 10/2013 | Dinan |
| 2013/0322363 A1* | 12/2013 | Chen .................. H04L 5/0053 370/329 |
| 2014/0016596 A1 | 1/2014 | Kim et al. |
| 2014/0328226 A1 | 11/2014 | Pan et al. |
| 2015/0215846 A1 | 7/2015 | Wang et al. |
| 2015/0245343 A1 | 8/2015 | Wang et al. |
| 2016/0156492 A1 | 6/2016 | Martinez |
| 2016/0192385 A1 | 6/2016 | Tooher et al. |
| 2017/0230948 A1 | 8/2017 | Chen et al. |
| 2021/0014030 A1 | 1/2021 | Matsumoto et al. |

FOREIGN PATENT DOCUMENTS

| | | |
|---|---|---|
| CN | 102958133 A | 3/2013 |
| CN | 103167614 A | 6/2013 |
| CN | 103828457 A | 5/2014 |
| WO | 2011/002263 A2 | 1/2011 |
| WO | 2014/112907 A1 | 7/2014 |
| WO | 2015/081132 A1 | 6/2015 |

OTHER PUBLICATIONS

International Search Report dated Oct. 22, 2015, issued in application No. PCT/CN2015/083807.

"3GPP Technical Specification Group Radio Access Network; Evolved Universal Terrestrial Radio Access (E-UTRA); Physical channels and modulation (Release 12); 3GPP TS 36.211 V12.2.0;" Jun. 2014; pp. 1-121.

Approved Report of 3GPP TSG RAN WG1 #40bis in Beijing; Athens, Greece, May 9-13, 2005; pp. 1-54.

3rd Generation Partnership Project; Technical Specification Group Radio Access Network; Evolved Universal Terrestrial Radio Access (E-UTRA); Physical layer procedures; Jun. 2014; pp. 1-207.

Detailed design on PDSCH for MTC enhancement; 3GPP TSG RAN WG1 Meeting #80bis; Belgrade, Serbia, Apr. 10-24, 2015; pp. 1-4.

Transmission and Reception of DL/UL Channels for Low cost UEs; 3GPP TSG RAN WG1 #81; Fukuoka, Japan, May 25-29, 2015; pp. 1-4.

Details on PRACH for MTC enhancement; 3GPP TSG RAN WG1 Meeting #80; Athens, Greece, Feb. 9-13, 2015; pp. 1-6.

"ZTE: Discussion on physical uplink control channel for MTC enhancement;" 3GPP TSG RAN WG1 Meeting #80; Feb. 2015; pp. 1-4.

Final Office Action dated Feb. 24, 2020, issued in U.S. Appl. No. 15/322,506 (copy not provided).

Chinese language office action dated Oct. 19, 2021, issued in application No. CN 201911037327.5.

\* cited by examiner

METHODS FOR ENB, UE UPLINK TRANSMISSION AND RECEPTION

CROSS REFERENCE TO RELATED APPLICATIONS

This application is a divisional of pending U.S. application Ser. No. 15/321,783 filed Dec. 23, 2016, which is a national stage application of International Application No. PCT/CN2015/083807 filed Jul. 10, 2015, which is a continuation-in-part of International Application No. PCT/CN2014/082096 entitled "Method for eNB, UE Uplink transmission and reception" filed on Jul. 11, 2014; the subject matter of which is incorporated herein by reference.

TECHNICAL FIELD

This disclosure relates generally to wireless communications and, more particularly, to uplink transmission and reception from different UEs.

BACKGROUND

Recently, there are more and more diverse requirements to the wireless communication system and correspondingly UE may have different capabilities. For example, in 3GPP LTE Release 12, a new UE category is defined with the capabilities of single Rx, limited to 1000 bit Transport Block Size (TBS) for unicast channel, and also can support half duplex FDD with single oscillator. The new defined UE category is for machine to machine (M2M) communication which has small data package but requires low device cost. On the other hand, a massive number of M2M device subscribers are predicted within dozens of years. In Rel-10, 3GPP studied on Machine Type Communication (MTC) congestion for RAN and core network. Furthermore, some of the M2M devices are very often installed in the basements of residential buildings or locations shielded by foil-backed insulations, metalized windows, or traditional thick-walled building constructions, such as metering. The coverage is a big issue for these metering. 3GPP RANI Rel-12 studied on 20 dB coverage extension for MTC devices. However, the solutions needs hundreds of repetitions, which is neither not very efficient from cell throughput point of view nor for device power consumption. On the other hand, in wireless network, some other applications such as vehicle to vehicle communication may require very short latency. These quite diverse requirements need a more efficient communication system. The benefit of wireless network transmission and reception technique is not limited to the examples above.

SUMMARY

Methods and apparatus are provided for the base station to handle different uplink channel from different UEs. Methods and apparatus are provided for the UE with different downlink and uplink channel and for the UE with narrowband operation.

In one novel aspect, the UE receives a downlink transmission and transmits an uplink channel with has different frequency domain subcarrier spacing and different time domain symbol duration. In one embodiment, the uplink channel is a SC-FMDA-based channel. In another embodiment, for uplink channels with large enough CP, the UE transmits the uplink channel without any transmission of the random access preamble and/or timing advance information from the eNB. In yet another embodiment, the base station receives a first uplink channel from a first UE and receives a second uplink channel from a second UE. The base station processes the different uplink channel by first applying filter process. In one embodiment, the first and the second uplink channel is not different and not overlapping. In yet another embodiment, the base station indicates to a second UE that the uplink resource elements. In one embodiment, the base station selects a second uplink subcarrier for the second UE.

In another novel aspect, frequency hopping is used. In one embodiment, the UE stays on the first frequency band for consecutive number of subframes before hopping to another frequency band. In one embodiment, the number of consecutive subframes is at least based on the number of subframes needed for cross subframe channel estimation. In another embodiment, the first set of resource elements and the second set of resource elements are discontinued with a gap in the time domain, wherein there is no resource element allocated for the communication channel for a gap number of subframes.

In another novel aspect, the UE obtains sub-band information and a resource index and generates a communication channel for data frame transmission and receiving. In one embodiment, the UE further acquires the sub-band set information through system information. In yet another embodiment, the resource index is acquired from DCI. In one embodiment, the UE acquires sub-band information in the wireless network. In one embodiment, the resource index is a PRB. In another embodiment, different resource blocks are selected for PUCCH. In one embodiment, PUCCH stays on a same frequency band for a consecutive number N of subframes before hopping to a different frequency.

In yet another novel aspect, resource blocks are selected for the PUCCH for a narrowband UE. The UE determines an operating sub-band information and selects one or more narrowband regions for the PUCCH.

Other embodiments and advantages are described in the detailed description below. This summary does not purport to define the invention. The invention is defined by the claims.

BRIEF DESCRIPTION OF DRAWINGS

The accompanying drawings, where like numerals indicate like components, illustrate embodiments of the invention.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Reference will now be made in detail to some embodiments of the invention, examples of which are illustrated in the accompanying drawings.

Figure 1:
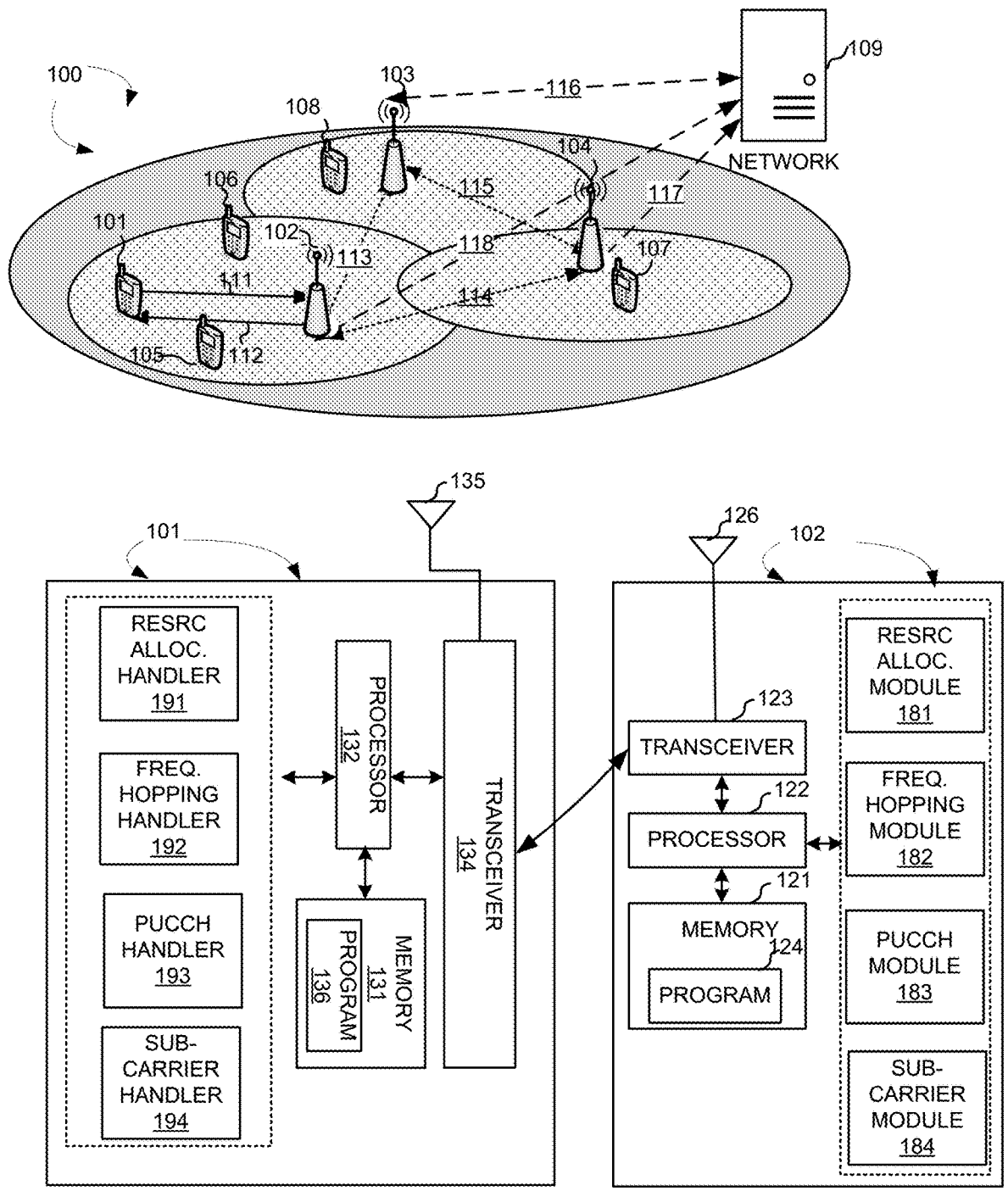
FIG. 1 illustrates a wireless communication system in accordance with embodiments of the current invention.

FIG. 1 illustrates a wireless communication system in accordance with some embodiments. Wireless communication system 100 includes one or more wireless networks, each of the wireless communication network has a fixed base infrastructure unit, such as wireless communications base stations 102, 103, and 104, forming wireless networks distributed over a geographical region. The base unit may also be referred to as an access point, an access terminal, a base station, a Node-B, an eNode-B, or by other terminology used in the art. Each of the receiving wireless communications base stations 102, 103, and 104 serves a geographic area. Backhaul connections 113, 114 and 115 connect the non-co-located wireless communications stations, such as base station 102, 103, and 104. These backhaul connections can be either ideal or non-ideal A wireless communications device, UE 101 in wireless network 100 is served by base station 102 via uplink 111 and downlink 112. Other wireless communications devices, UE 105, 106, 107, and 108 are served by different base stations. UE 105 and 106 are served by base station 102. UE 107 is served by base station 104. UE 108 is served by base station 103.

In one embodiment, the eNB can serve different kind of UEs. UE 101 and 106 may belong to different categories, such as having different RF bandwidth or different subcarrier spacing. UE belonging to different categories may be designed for different use cases or scenarios. For example, some use case such as Machine Type Communication (MTC) may require very low throughput, delay torrent, the traffic packet size may be very small (e.g., 1000 bit per message), extension coverage. Some other use case, e.g. intelligent transportation system, may be very strict with latency, e.g. orders of 1 ms of end to end latency. Different UE categories may be introduced for these diverse requirements. Different frame structures or system parameters may also be used in order to achieve some special requirement. For example, different UEs may have different RF bandwidths, subcarrier spacing values, omitting some system functionalities (e.g., random access, CSI feedback), or use physical channels/signals for the same functionality (e.g., different reference signals).

FIG. 1 further shows simplified block diagrams of UE 101 and base station 102 in accordance with the current invention.

Base station 102 has an antenna 126, which transmits and receives radio signals. A RF transceiver module 123, coupled with the antenna, receives RF signals from antenna 126, converts them to baseband signals and sends them to processor 122. RF transceiver 123 also converts received baseband signals from processor 122, converts them to RF signals, and sends out to antenna 126. Processor 122 processes the baseband signals, generates a communication channel and invokes different functional modules to perform features in base station 102. Memory 121 stores program instructions and data 124 to control the operations of base station 102.

Base station 102 also includes a set of control modules that carry out functional tasks. A resource allocation module 181 handles resource allocation related functions including sub-bands information for one or more UEs. A frequency hopping module 182 that handles UE frequency hopping related functions. A PUCCH module 183 handles related functions for PUCCH of narrowband UEs. A sub-carrier module 184 handles sub-carrier spacing related functions for one or more UEs. A HARQ module handles HARQ related functions for narrowband UEs. A random access module handles random access or a contention based uplink message from UEs. UE 101 has an antenna 135, which transmits and receives radio signals. A RF transceiver module 134, coupled with the antenna, receives RF signals from antenna 135, converts them to baseband signals and sends them to processor 132. RF transceiver 134 also converts received baseband signals from processor 132, converts them to RF signals, and sends out to antenna 135. Processor 132 processes the baseband signals and invokes different functional modules to perform features in UE 101. Memory 131 stores program instructions and data 136 to control the operations of UE 101.

UE 101 also includes a set of control modules that carry out functional tasks. A resource allocation handler 191 obtains resource allocation comprising sub-band information and a resource index and generates a communication channel. A frequency hopping handler 192 handles frequency hopping related functions for narrowband UEs. A PUCCH handler 193 handles PUCCH allocation for narrowband UEs. A subcarrier handler 194 handles subcarrier spacing related functions for UEs. A HARQ module handles HARQ related functions for narrowband UEs. A random access module handles random access or a contention based uplink message related functions.

In one embodiment, the wireless communication system 100 utilizes an OFDMA or a multi-carrier based architecture including Adaptive Modulation and Coding (AMC) on the downlink and next generation single-carrier (SC) based FDMA architecture for uplink transmissions. SC based FDMA architectures include Interleaved FDMA (IFDMA), Localized FDMA (LFDMA), and DFT-spread OFDM (DFT-SOFDM) with IFDMA or LFDMA. In OFDMA based systems, UE 101 and 105-108 are served by assigning downlink or uplink radio resources that typically comprises a set of sub-carriers over one or more OFDM symbols. Exemplary OFDMA-based protocols include the developing Long Term Evolution (LTE) of the 3GPP UMTS standard and the IEEE 802.16 standard. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading. In other embodiments, the architecture may be based on simpler time and/or frequency division multiplexing/multiple access techniques, or a combination of these various techniques. In alternate embodiments, the wireless communication system 100 may utilize other cellular communication system protocols including, but not limited to, TDMA or direct sequence CDMA.

For example, in the 3GPP LTE system based on SC-FDMA uplink, the radio resource is partitioned into sub-frames, and each of the subframes comprises 2 slots and each slot has 7 SC-FDMA symbols in the case of normal Cyclic Prefix (CP). For each user, each SC-FDMA symbol further comprises a number of subcarriers depending on the uplink assignment. The basic unit of the radio resource grid is called Resource Element (RE) which spans an SC-FDMA subcarrier over one SC-FDMA symbol.

Each UE gets an assignment, i.e., a set of REs in a Physical Uplink Shared Channel (PUSCH), when an uplink packet is sent from a UE to an eNB. The UE gets the downlink and uplink assignment information and other control information from its Physical Downlink Control Channel (PDCCH) or Enhanced Physical Downlink Control Channel (EPDCCH) whose content is dedicated to that UE. The uplink assignment is indicated in downlink control information (DCI) in PDCCH/EPDCCH. Usually, the uplink assignment indicated the resource allocation within one certain subframe, for example k+4 subframe if DCI is received in subframe k for FDD and for TDD, the timing relationship is given in a table in TS 36.213. TTI bundling is used in uplink transmission in LTE system to improve uplink coverage. If TTI bundle is enabled, one uplink assignment indicates several subframes to transmit one transport block using different redundancy version (RV).

Uplink control information is transmitted in Physical Uplink Control Channel (PUCCH) or transmitted with or without a transport block in PUSCH. UCI includes HARQ, scheduling request (SR), channel status information (CSI). PUCCH is allocated the border PRBs in uplink system bandwidth. Frequency diversity gain for PUCCH is obtained by frequency hopping between two slots in one subframe. Code Division Multiplexing (CDM) is used for PUCCH multiplexing between different UEs on the same radio resource.

In one embodiment of the disclosure, a method for UE to transmit to an eNB an uplink channel carrying data or control information bits is provided, the method comprising: receiving an OFDM-based downlink channel occupying a set of downlink resource elements, where each downlink resource element has a downlink subcarrier spacing in the frequency domain and a downlink symbol duration in the time domain; generating a SC-FDMA based uplink channel from the information bits, where the uplink channel occupies a set of uplink resource elements and each uplink resource element has a uplink subcarrier spacing in the frequency domain different from the downlink subcarrier spacing, and a uplink symbol duration in the time domain different from the downlink symbol duration; and transmitting the SC-FDMA based uplink channel. In one embodiment, the information bits are uplink data information bits. In another embodiment, the information bits are uplink control information bits.

In one embodiment, generating a SC-FDMA based uplink channel further comprising: mapping the information bits to a block of QPSK or QAM symbols; transforming the block of QPSK/QAM symbols via DFT to obtain multiple complex-valued symbols; mapping the multiple complex-valued symbols to the set of uplink resource elements. The uplink channel may further include reference signals for information bits demodulation. The location and waveform of the reference signals are pre-known by both eNB and UE, which can be configured via RRC message, or indicated with uplink assignment or pre-defined in the specification. The subcarrier spacing values of the reference signals can be same or different with the uplink subcarrier spacing for the modulated information bits. The modulated information bits and reference singles can be multiplexed in frequency domain or time domain.

For the sake of eNB decoding complexity and signaling overhead, in one embodiment, the uplink subcarrier spacing is pre-defined. On the other hand, in order to increase the flexibility, in another embodiment, the uplink subcarrier spacing is configured to the UE by higher layer signaling. For example, UE receives system information to obtain the uplink subcarrier spacing of the uplink resource elements. In another example, UE receives the RRC message to obtain the uplink subcarrier spacing of the uplink resource elements. In this example, the uplink sub-carrier spacing can be uni-casted or group-casted. And the uplink subcarrier spacing information can be UE-specific. Alternatively, it can be cell-specific. In another embodiment, for some special cases, the uplink subcarrier spacing can be dynamically configured. For example, UE can receive an uplink assignment message to obtain the uplink subcarrier spacing of the uplink resource elements. Sometimes, UE needs to obtain the uplink subcarrier spacing information with both higher layer singling and physical layer signaling. For example, UE receives a uplink subcarrier spacing value set in a higher layer signaling, e.g., in System Information (SI), and the uplink subcarrier spacing is indicated by a physical layer signaling, e.g. in Downlink Control Information (DCI).

Alternatively, the uplink subcarrier spacing value set can be pre-defined and known to the UE. Another example for UE to obtain the uplink subcarrier spacing is that UE obtains the uplink subcarrier spacing information by obtaining the radio resource region (e.g., a sub-band) for its uplink transmission. UE obtains the uplink subcarrier spacing value set and the radio resource region corresponding to each uplink subcarrier spacing in the uplink subcarrier spacing set. The corresponded radio resource region can be configured by higher layer signaling (e.g., in SI), which can be changed semi-statically. Alternatively, the corresponded radio resource region can be defined in specification. The corresponding radio resource region can be UE-specific, which means different UEs can have different radio resource regions to transmit with the same uplink sub-carrier spacing, or different UEs may transmit with the same uplink subcarrier spacing in same radio resource region or different radio resource regions. Alternatively, the corresponded radio resource region can be cell-specific, which means all the UEs in the cell will transmitted uplink waveform with the same uplink subcarrier value. Since each value in the uplink subcarrier spacing value set is associated with one corresponding radio resource region, e.g., a sub-band, the uplink sub-carrier spacing can be implied by the resource allocation for the uplink assignment (e.g., by a physical layer signaling) or the configured corresponding radio resource region (e.g., by a higher layer signaling to configure which radio resource is configured to the UE for uplink transmission). Note that, not all the UEs in the cell need to know all the subcarrier spacing values. eNB is expected to handle it if some UEs do not know more than one subcarrier spacing values. For example, legacy UEs may assume subcarrier spacing is 15 kHz for uplink data channel and control channel. Also noted that, in another embodiment, a default uplink subcarrier spacing can be used by the UE, which is the same with the downlink subcarrier spacing, until the UE gets an indication of a new uplink subcarrier spacing value (e.g., the uplink subcarrier spacing), e.g., by RRC signaling or physical layer signaling.

In another embodiment of the disclosure, a method for an eNB to receive uplink channels carrying data or control information bits is provided, the method comprising: receiving a first uplink channel from a first UE on a first set of uplink resource elements where each uplink resource element has a first uplink subcarrier spacing in the frequency domain and a first uplink symbol duration in the time domain; and receiving a second uplink channel from a second UE on a second set of uplink resource elements where each uplink resource element has a second uplink subcarrier spacing in the frequency domain differing from the first uplink subcarrier spacing, and a second uplink symbol duration in the time domain differing from the first uplink symbol duration. In one example, the uplink channel carries the uplink data information bits from the UE. In another example, the uplink channel carries the uplink control information bits from the UE. In one example, the uplink channel is based on SC-FDMA.

The multiplexing scheme of two UEs, e.g. the first UE and the second UE can be frequency division multiplexed (FDM). For example, the first set of uplink resource elements and second set of uplink resource elements are not overlapping in the frequency domain, but occupy the same time duration. More than one UE may use the same set of uplink resource elements for the transmissions of uplink channels with the second uplink subcarrier spacing. These more than one UE can be code-division multiplexed (CDM) or space division multiplexed (SDM) using the same set of uplink resource elements. Multiple UEs using the second uplink subcarrier spacing can also be frequency division multiplexed (FDM) by using different sets of uplink resource elements. In an example, the first uplink subcarrier is the same as the downlink subcarrier spacing of the downlink resource elements.

Similar as previous embodiments, the second subcarrier spacing is pre-defined. Alternatively, eNB configures the second subcarrier spacing by higher layer signaling or in physical layer signaling, e.g. SI, or in RRC message. And the second subcarrier spacing information can be UE-specific or cell-specific. In another embodiment, eNB configure the uplink subcarrier spacing value set in higher layer signaling (e.g., in system information) and further indicate the second subcarrier spacing value later via a higher layer signaling (e.g., in RRC message) or a physical layer signaling (e.g., in DCI). Alternatively, the uplink subcarrier spacing value set can be pre-defined and known to the UE. In another embodiment, eNB can indicate explicit or implicit the second subcarrier spacing to the UE, for example by the second set of uplink resource elements.

In another embodiment of the disclosure, a method for an eNB to receive uplink channels carrying data or control information bits, the method comprising: receiving an mixed time domain signal on an uplink system bandwidth from the first UE and the second UE; discarding a first length of cyclic prefix (CP); transforming the mixed time domain signal with the first uplink symbol duration after the first length of CP on the uplink system bandwidth into a first frequency domain signal based on the first uplink subcarrier spacing; repeating the discarding CP and the transforming mixed time domain signal until obtaining all of the first set of uplink resource elements; selecting the signals on the first set of uplink resource elements and decoding the signals on the first set of uplink resource elements to obtain the first uplink channel from the first UE. The method further comprising: filtering out a second time domain signal on an uplink sub-band within the uplink system bandwidth, wherein the uplink sub-band including all of the second set of uplink resource elements; discarding a second length of CP and transforming the second time domain signal with the second uplink symbol duration after the second length of CP on the uplink sub-band into a second frequency domain signal based on the second uplink subcarrier spacing; repeating discarding CPs and transforming the second time domain signals until obtaining all of the second set of uplink resource elements; picking up the signals on the second set of uplink resource elements and decoding the signals on the second set of uplink resource elements to obtain the second uplink channel from the second UE. In one example, the first and second length of CP can be the same or different.

Different subcarrier spacing values will result in different symbol durations. For example, the first uplink subcarrier spacing in frequency domain corresponds with the first symbol duration in time domain, and the second uplink subcarrier spacing corresponds with the second symbol duration in time domain. Similarly, different uplink and downlink subcarrier spacing values also result in different symbol durations. The definition of slot/subframe (e.g., slot and subframe length are 0.5 ms and 1 ms respectively in LTE system) can be reused for different subcarrier spacing values. This means the number of symbol(s) is different in one slot or one subframe with different subcarrier spacing values. For example, for 15 kHz subcarrier spacing, six or seven symbols can fit in one slot (i.e., 0.5 ms) and for 3.75 kHz subcarrier spacing, only 1.5 symbols can fit in one slot. Alternatively, different lengths of subframe/slot can be defined for different subcarrier spacing values. For example, in order to keep six or seven symbols for 3.75 kHz in each slot, one slot can be defined as 2 ms. Cyclic prefix (CP) is used to avoid interference and the length needs to cover the maximum delay spread of the fading channel if the timing advance is introduced to compensate the Round Trip Time (RTT) delay so that the uplink signals from different UEs can arrive at the receiver almost the same time. A smaller subcarrier spacing value gives a chance to design a long CP with the same overhead. For example, with 3.75 kHz subcarrier spacing, 66.7 μs can be used as one CP compared with 5.1/4.7 μs CP length for 15 kHz subcarrier spacing. With a longer CP for uplink, the Timing Advance (TA) can be eliminated. In one embodiment, UE transmits the SC-FDMA based uplink channel without obtaining any TA information from the eNB. In LTE system, a preamble with a long CP is designed for Random Access Channel (RACH) to let eNB to estimate the TA from each UE. If long CP is used for uplink data or control information transmission, there is no need for UE to transmit random access preamble for TA. That is, UE transmits the SC-FDMA based uplink channel without any transmission of the random access preamble. Correspondingly eNB receives an uplink channel carrying data or control information bits without receiving the random access preamble, or without any configuration of TA to UEs.

In another example, the method for an eNB to receive uplink channels carrying data or control information bits is provided, the method further comprising: indicating to the second UE the second set of uplink resource elements where each uplink resource element has the second uplink subcarrier spacing in the frequency domain differing from the first uplink subcarrier spacing, and the second symbol duration in the time domain differing from the first symbol duration based on at least one condition. eNB needs to distinguish which UE needs to be indicated with the second uplink subcarrier spacing. In one example, the eNB indicates the second UE to use the second uplink subcarrier spacing based on a report from the second UE. In another example, the eNB indicates the second UE to use the second uplink subcarrier spacing based on a message from core network. Alternatively, the second uplink subcarrier is selected by the second UE. The second uplink subcarrier can be selected from the uplink subcarrier spacing value set. When both of the embodiments for the second UE to select the second subcarrier spacing or for the eNB to indicate to the second UE the second uplink subcarrier spacing, based on the at least one condition. The at least one condition is at least one of the following: a channel condition; a transmission mode; a TBS; a latency requirement; a UE category; a traffic type; the need of TA; the need of transmitting random access preamble. For examples, the eNB indicates to the second UE the second uplink subcarrier spacing if the uplink channel condition from the second UE is worse than a threshold; or if the buffer status report from the second UE is smaller than a threshold; or if the latency requirement of the second UE is relax enough; or if the second UE belong to a special UE category; or if the traffic type of the second UE belong to a special traffic type; or if the UE identify of the second UE belongs to a special group; or if the second UE does not need TA before uplink transmission for data or control information; or if the eNB does not need to receive the random access preamble from the second. Similar conditions are also applied when the second UE selects the second uplink subcarrier spacing. The at least one condition can be configured by higher layer signaling or pre-defined in the specification. For example, for a special UE category, the sub-carrier spacing value is 3.75 kHz but for other UE categories, the subcarrier spacing value is 15 kHz. Noted that, in another embodiment, a default subcarrier spacing (e.g., the first uplink subcarrier spacing) can be pre-defined to UE until UE gets an indication of a new subcarrier spacing value (e.g., the second uplink subcarrier spacing), e.g., by RRC signaling or physical layer signaling.

Figure 2:
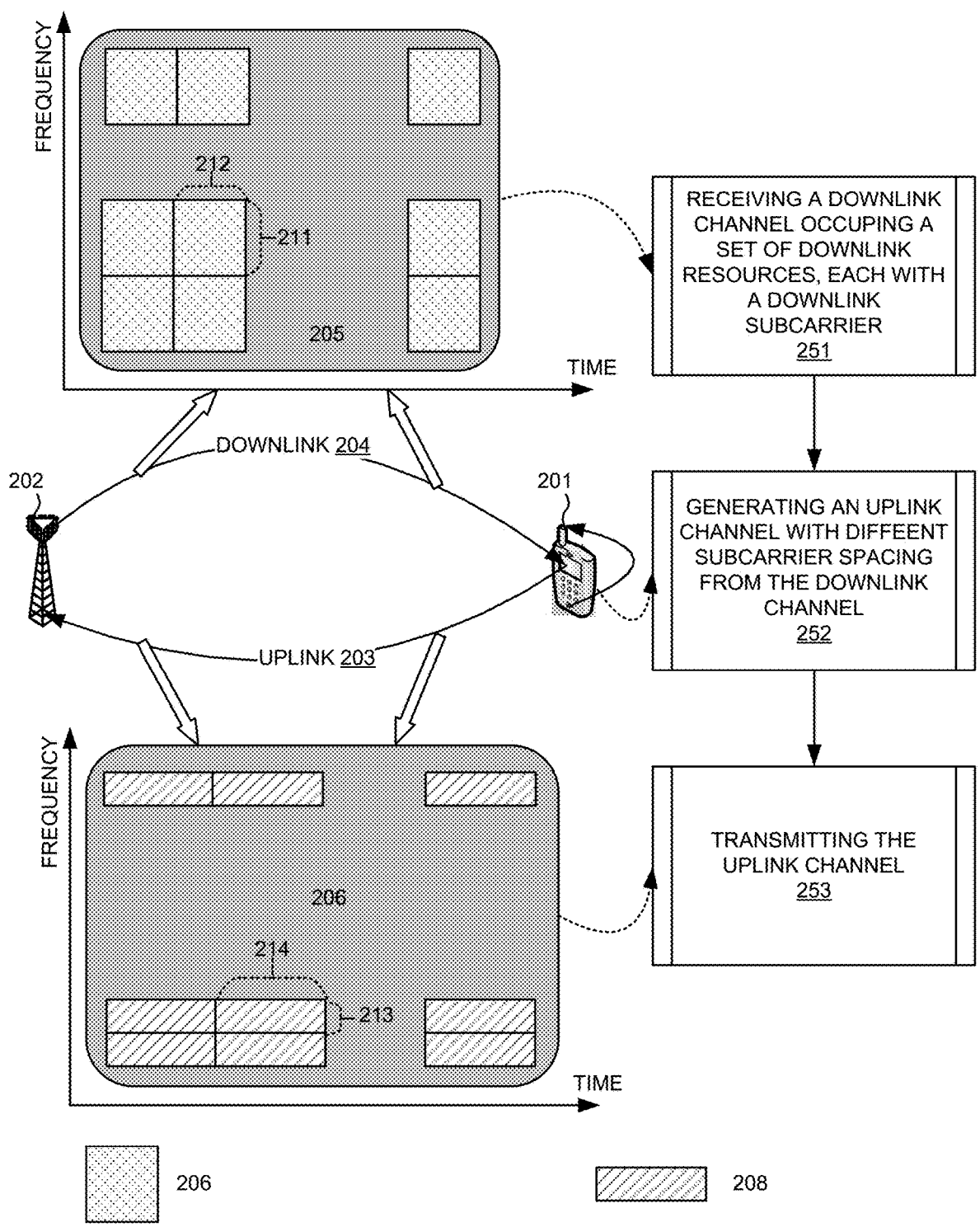
FIG. 2 illustrates an exemplary diagram of the UE receiving a downlink channel with downlink subcarrier spacing and transmitting an uplink channel with uplink subcarrier spacing in accordance with embodiments of the current invention.

FIG. 2 illustrates an example of UE receiving a downlink channel with downlink sub-carrier spacing and transmitting an uplink channel with uplink subcarrier spacing in accordance with some embodiments of current invention. In one embodiment of the disclosure, a method for UE 201 to transmit to an eNB 202 an uplink channel 203 carrying data or control information bits, the method comprising: receiving an OFDM-based downlink channel 204 occupying a set 205 of downlink resource elements 206, where each downlink resource element 206 has a downlink sub-carrier spacing 211 in the frequency domain and a downlink symbol duration 212 in the time domain(step 251); generating a SC-FDMA based uplink channel 203 from the information bits, where the uplink channel 203 occupies a set 207 of uplink resource elements 208 and each uplink resource element 208 has a uplink subcarrier spacing 213 in the frequency domain differing from the downlink subcarrier spacing 211, and a uplink symbol duration 214 in the time domain differing from the downlink symbol duration 212 (step S52); and transmitting the uplink channel 203, e.g., SC-FDMA based uplink channel to eNB 202,(step S53). And FIG. 2 also illustrates a flow chart of UE receiving a downlink channel with downlink subcarrier spacing and receiving an uplink channel with uplink subcarrier spacing. Description in details refers to the above.

Figure 3:
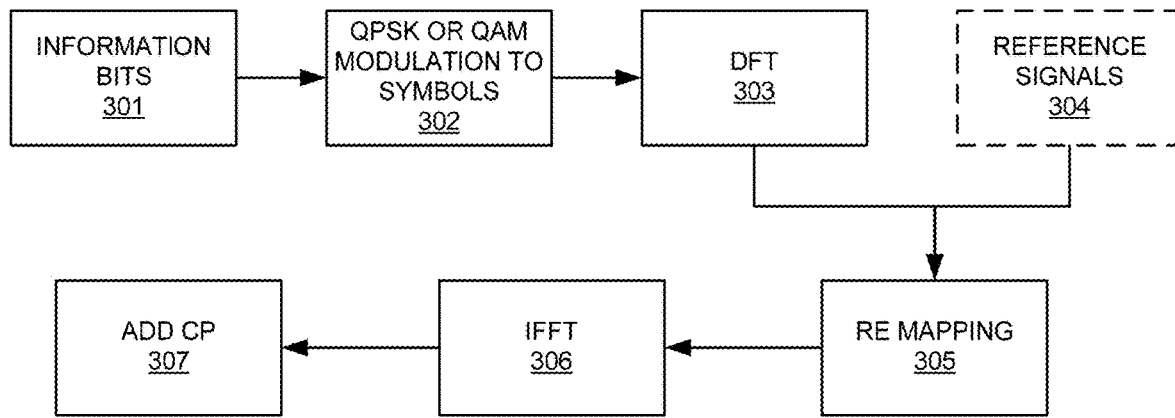
FIG. 3 illustrates an exemplary diagram of generating a SC-FDMA based uplink channel in accordance with embodiments of the current invention.

FIG. 3 illustrates an example of generating a SC-FDMA based uplink channel in accordance with some embodiments of current invention. In FIG. 3, generating a uplink channel further comprising: obtain the information bits in block 301, mapping the information bits to a block of QPSK or QAM symbols in block 302; transforming the block of QPSK/QAM symbols via DFT to obtain complex-valued symbols in block 303; remapping the complex-valued symbols to the set of uplink resource elements in block 305. The uplink channel may further include reference signals 304 for information bits demodulation. The reference signals 304 and uplink channel are mapped to resource elements (REs), where the location and the waveform of the reference signals 304 are pre-known by both eNB and UE. For example, the location and waveform of the reference signals is configured via RRC message, or indicated with uplink assignment or pre-defined in the specification. The set of the resource elements for uplink channel is also known by both eNB and UE. For example, the set of the resource elements for uplink channel is indicated in uplink assignment in DCI. IFFT can be used to transmit frequency domain signals into time domain in block 306. Before sending out, CP is added in block 307 to avoid interference.

Figure 4:
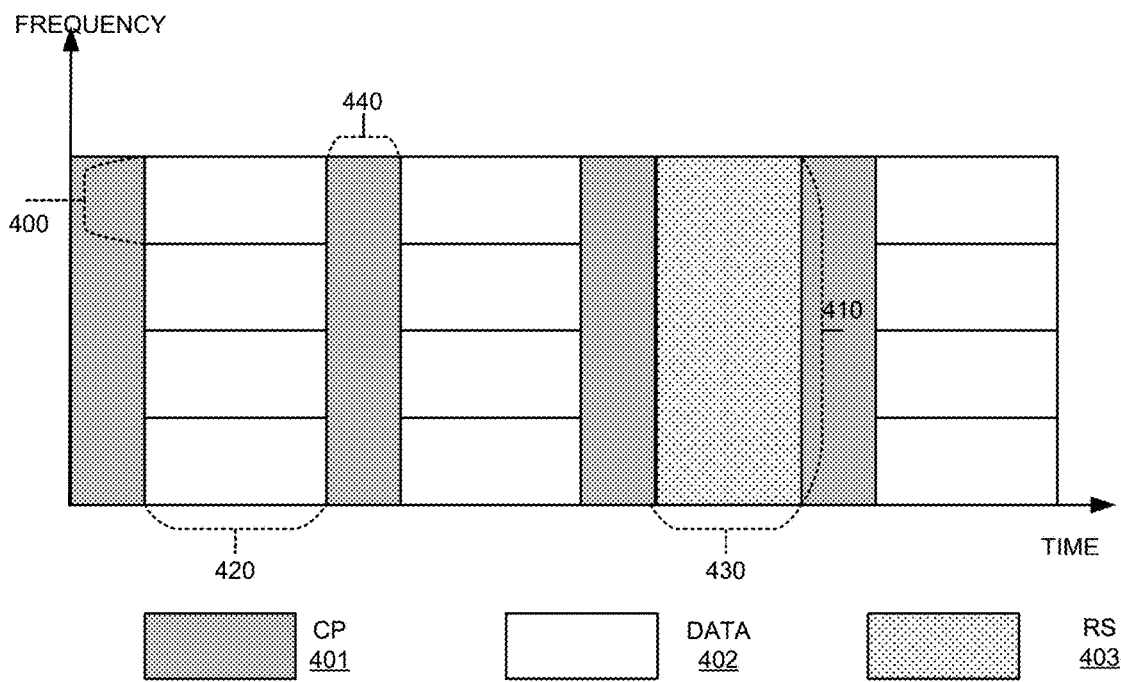
FIG. 4 illustrates an exemplary diagram of different subcarrier spacing for reference signals and data signals in accordance with embodiments of the current invention.

The subcarrier spacing value of the reference signals can be same or different with the uplink subcarrier spacing for the modulated information bits. The modulated information bits and reference signals can be multiplexed in frequency domain or time domain. FIG. 4 illustrates an example of different subcarrier spacing for reference signal and data signal with some embodiments of current invention. Data signal uses subcarrier spacing 400 while reference signal uses subcarrier spacing 410. If subcarrier spacing 410 is larger than 400, the symbol length 420 of data signal is longer than symbol length 430 of reference signal. However, the CP length 440 for both data signal and reference signal can be the same as FIG. 4 shown. Table 1 gives some examples of reference signal design with same or different subcarrier spacing values between reference signal and data signal. From Table 1, the overhead of reference signal and CP is smaller if a larger subcarrier spacing value is used for reference signal. However, the smallest granularity of resource allocation in frequency domain to one UE is limited by the largest subcarrier spacing. For example, if subcarrier spacing values of data and reference signal are 3.75 kHz and 15 kHz respectively, the smallest granularity of resource allocation in frequency domain assigned to one UE is 15 kHz, which means four data subcarriers in frequency domain as FIG. 4 shown.

Figure 5:
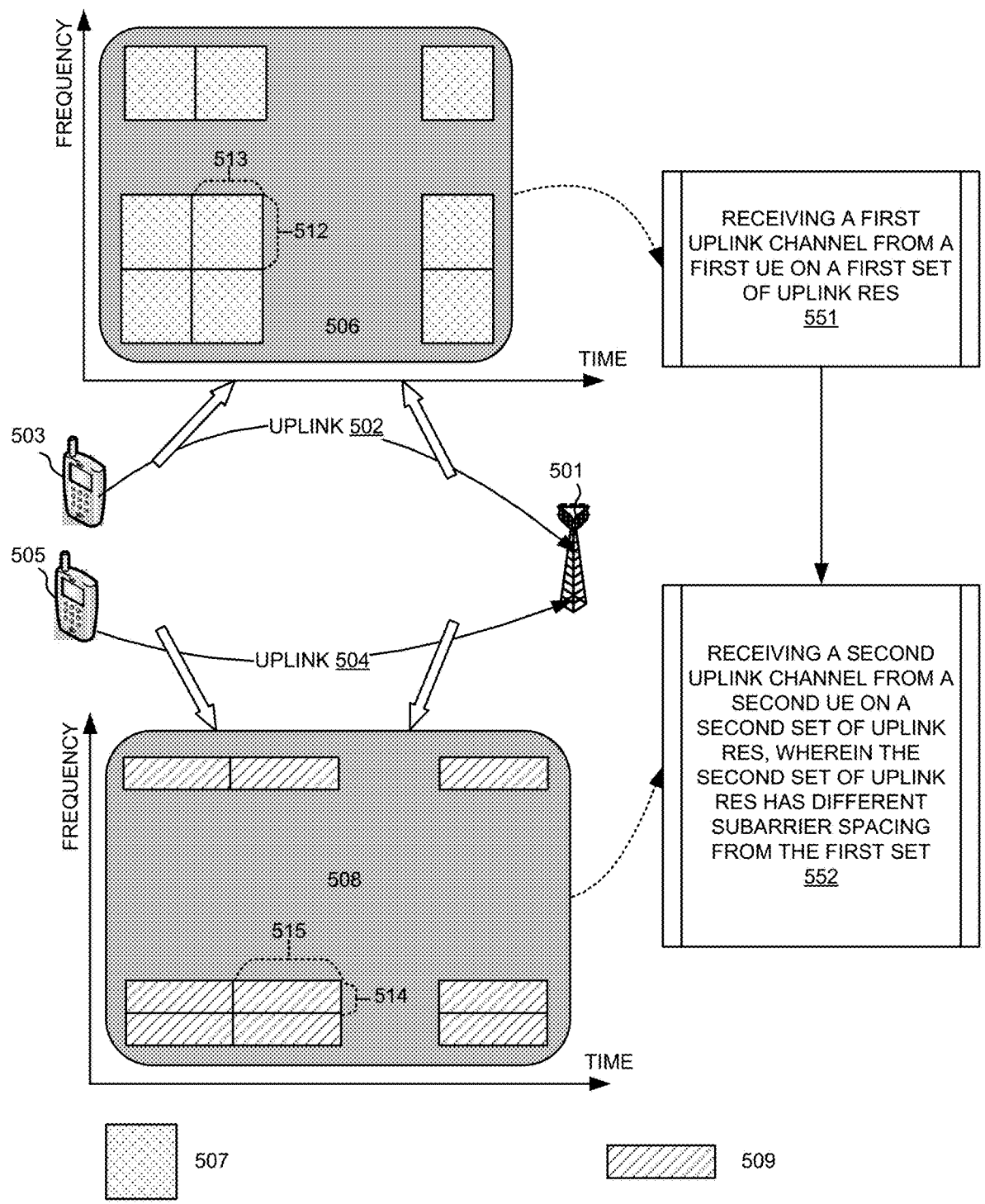
FIG. 5 illustrates an exemplary diagram of eNB receiving uplink channels from multiple UEs with different subcarrier spacing in accordance with embodiments of the current invention.

FIG. 5 illustrates an example of eNB receiving uplink channels from multiple UEs with different subcarrier spacing according to one embodiment of current invention. The method for an eNB 501 to receive uplink channels 502 and 504 carrying data or control information bits, comprising: receiving a first uplink channel 502 from a first UE 503 on a first set 506 of uplink resource elements 507 where each uplink resource element 507 has a first uplink subcarrier spacing 512 in the frequency domain and a first uplink symbol duration 513 in the time domain (step 551); and receiving a second uplink channel 504 from a second UE 505 on a second set 508 of uplink resource elements 509 where each uplink resource element 509 has a second uplink sub-carrier spacing 514 in the frequency domain differing from the first uplink subcarrier spacing 512, and a second uplink symbol duration 515 in the time domain differing from the first uplink symbol duration 513 (step 552), wherein the first uplink channel and the second uplink channel are using the same the same RAT. In one example, the first uplink channel and the second uplink channel are based on SC-FDMA. In an example, the first uplink sub-carrier spacing 512 is the same as the downlink subcarrier spacing 211 of the downlink resource elements 205 (in FIG. 2). And FIG. 5 also illustrates a flow chart of eNB receiving uplink channels from multiple UEs with different subcarrier spacing. Description in details refers to the above.

Figure 6:
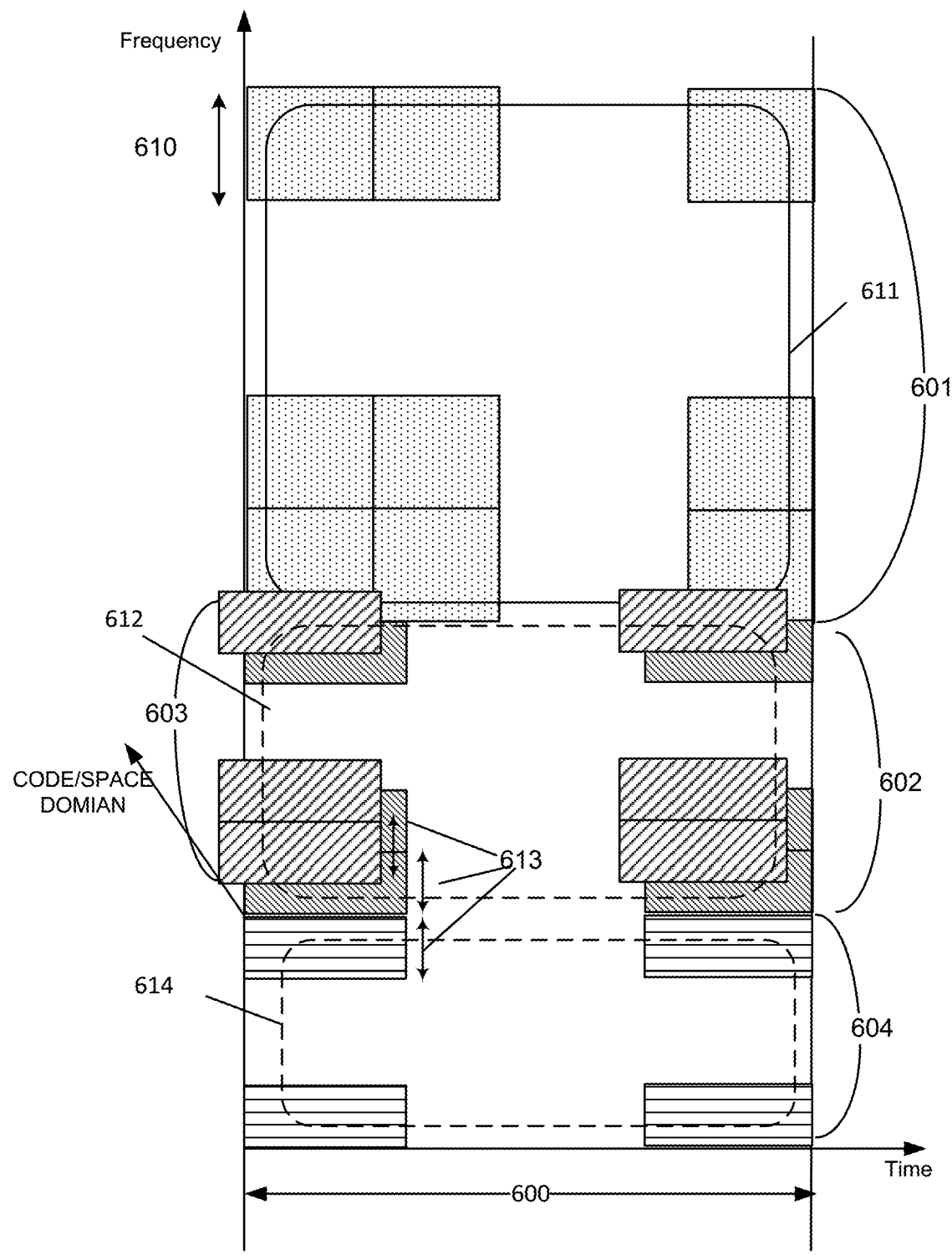
FIG. 6 illustrates an exemplary diagram of multiplexing schemes of different UEs in accordance with embodiments of the current invention.

FIG. 6 illustrates examples of multiplexing schemes of different UEs according to the embodiments of current invention. In FIG. 6, the multiplexing scheme of the first UE 601 and the second UE 603 can be Frequency Division Multiplexed (FDM). For example, the first set 611 of uplink resource elements and the second set 612 of uplink resource elements are not overlapping in the frequency domain, but occupy the same time duration 600, and the first uplink sub-carrier spacing 610 of the first set 611 of uplink resource elements is different from the second uplink subcarrier spacing 613 of the second set 612 of uplink resource elements. More than one UE 602 and 603 may use the same set 612 of uplink resource elements for the transmissions of uplink channels with the second uplink subcarrier spacing 613. These more than one UE 602 and 603 can be Code Division Multiplexed (CDM) or Space Division Multiplexed (SDM) using the same set 612 of uplink resource elements. Multiple UE 602 and UE 604 using the second uplink sub-carrier spacing 613 can also be Frequency Division Multiplexed (FDM) by using different sets 612 and 614 of uplink resource elements.

Figure 7:
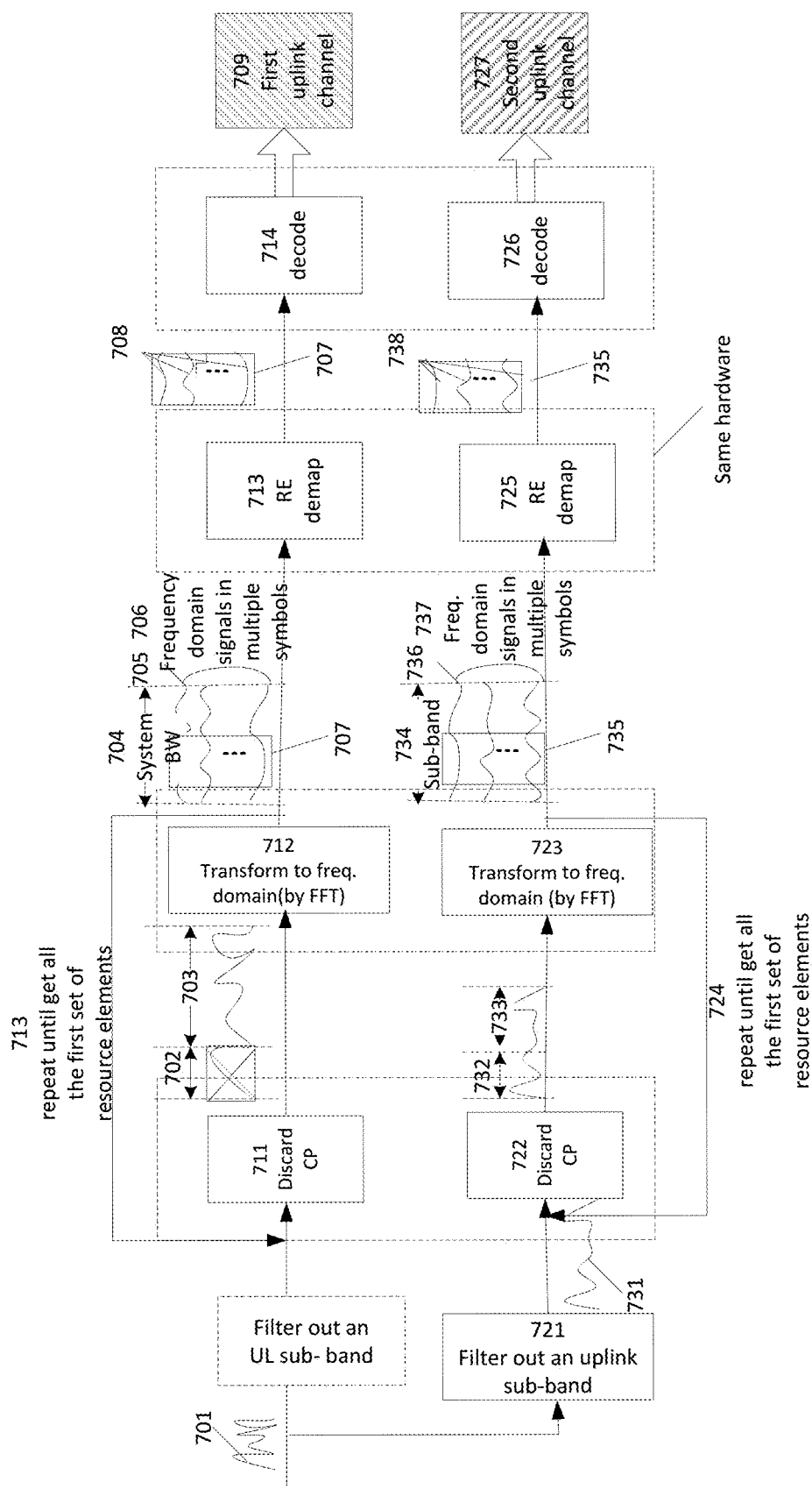
FIG. 7 illustrates an exemplary diagram of eNB receiving uplink channels with different subcarrier spacing in accordance with embodiments of the current invention.

FIG. 7 illustrates examples of eNB receiving uplink channels on different sub-bands with different subcarrier spacing values according to the embodiments of current

TABLE 1

| Examples of reference signal design | | | | |
|---|---|---|---|---|
| Date subcarrier spacing/ Symbol length | 3.75 kHz/ 266.7 μs | 3.75 kHz/ 266.7 μs | 2.5 kHz/ 400 μs | 2.5 kHz/ 400 μs |
| CP length | 66.7 us | 33.3 μs | 100 μs | 44.4 μs |
| Reference signal subcarrier spacing & symbol length | 3.75 kHz/ 266.7 μs | 15 kHz/ 66.7 μs | 2.5 kHz/ 400 μs | 15 kHz/ 66.7 μs |
| Cell radius (no timing advance) | 10.3 km | 4.7 km | 15.8 km | 6.7 km |
| Overhead (including reference signal and CP) | 1 RS symbol every 1 ms: 47% 1 RS symbol every 2 ms: 33.3% | 1 RS symbol every 1 ms: 20% | 1 RS symbol every 1 ms: 60% 1 RS symbol every 2 ms: 40% | 1 RS symbol every 1 ms: 20% | invention. In FIG. 7, eNB receives a mixed time domain signal 701 on an uplink system bandwidth 704 from the first UE and the second UE; discards (by block 711) a first length 702 of cyclic prefix (CP) (block 711 is optional, because block 711 could be omitted when the CP does not need to be discards); transforms (e.g., by FFT 712) the mixed time domain signal 701 with the first uplink symbol duration 703 after the first length 702 of CP on the uplink system bandwidth 704. Alternatively, 704 is an uplink sub-band. In this case, after receiving the mixed time domain signal 701, there is a filter using for filter out an UL sub-band. In the eNB, the filters for the first path and the second path could be one multi-band filter or multiple filters. It turns the signal into a first frequency domain signal 705 based on the first uplink subcarrier spacing; repeats (by block 713) discarding CP and transforming (e.g., by FFT 712) mixed time domain until obtaining all of the first set 707 of uplink resource elements. For example eNB gets frequency domain signals 706 in multiple symbol durations; de-mapping (i.e. RE de-mapping 713) the signals 708 on the first set 707 of uplink resource elements, and decodes 714 the signals 708 on the first set 707 of uplink resource elements to obtain the first uplink channel 709 from the first UE. The method further comprising: filtering out 721 a second time domain signal 731 on an uplink sub-band 734 within the uplink system bandwidth 704 from the mixed time domain signal 701, wherein the uplink sub-band 734 including all of the second set 735 of uplink resource elements; discarding 722 a second length 732 of CP (block 722 is also optional) and transforming (e.g., by FFT 723) the second time domain signal 731 with the second uplink symbol duration 733 after the second length 732 of CP on the uplink sub-band 734 into a second frequency domain signal 736 based on the second uplink subcarrier spacing; repeating 725 discarding CPs 722 (block 722 is also optional) and transforming 723 the second time domain signals to get frequency domain signals 737 in multiple symbols until obtaining all of the second set 735 of uplink resource elements; de-mapping (i.e., RE de-mapping 725) the signals 739 on the second set 735 of uplink resource elements and decoding 726 the signals on the second set 735 of uplink resource elements to obtain the second uplink channel 727 from the second UE. In one example, the first length 702 of CP and second length 732 of CP can be the same or different. eNB can use the same hardware to implement the procedures from block 711 to 714 for the first UE with first subcarrier spacing and then implement the procedures from block 722 to 726 for the second UE with the second subcarrier spacing. Comparing to supporting single subcarrier spacing type of UEs, only one extra hardware component (i.e. a filter) is needed. Alternatively, eNB can have multiple groups of hardware to serve different UEs with different subcarrier spacing. More hardware will increase the cost but save the processing time (i.e., decoding latency).

Figure 8:
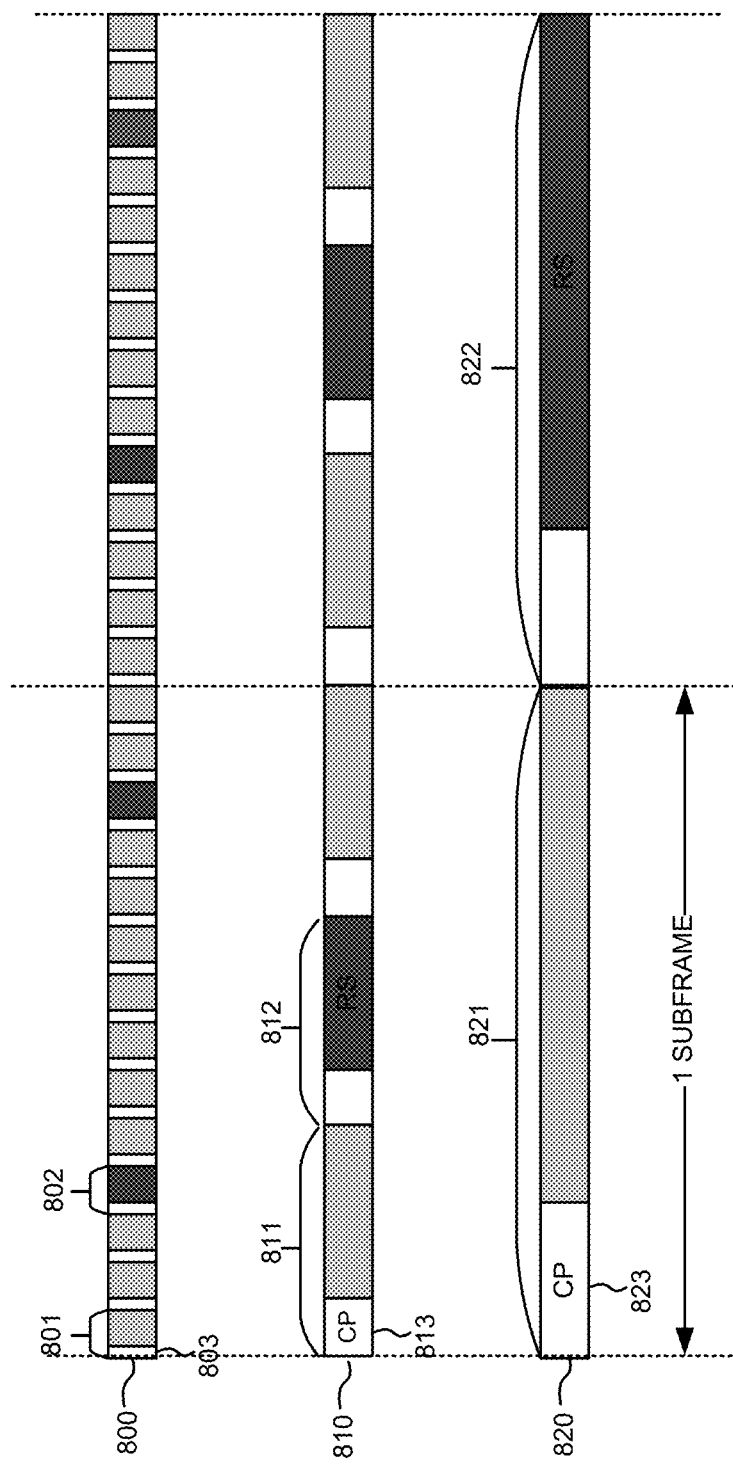
FIG. 8 illustrates an exemplary diagram of symbol length and CP length of different subcarrier spacing values in accordance with embodiments of the current invention.

FIG. 8 illustrates an example of symbol length and CP length of different subcarrier spacing value according to the embodiment of current invention. Because symbol length=1/sub-carrier spacing, the larger subcarrier spacing value has a shorter symbol duration, and smaller sub-carrier spacing results in a longer symbol duration. For example, when subcarrier spacing=15 kHz, symbol duration=1/15 kHz 66.7 μs and when subcarrier spacing=3.75 kHz/1.25 kHz, symbol duration 266.7 μs/800 μs respectively. If the same length of duration as one subframe is defined for different subcarrier spacing values, the number of symbols in one subframe is different for different subcarrier spacing values. For example as FIG. 8 shown, there are fourteen symbols for subcarrier spacing 800, three symbols for sub-carrier spacing 810 and one symbol for sub-carrier spacing 820 within one subframe if the subframe length is the same. Cyclic prefix (CP) is used for OFDM system to avoid the effect of interference caused by multipath propagation. Usually, the CP shall be longer than the maximum delay spread. On the other hand, the long CP results in large overhead, which will degrade spectral efficiency. In current LTE system, the subcarrier spacing is 15 kHz for downlink and uplink control and data channel, and each subframe is 1ms with fourteen OFDM symbols with one 5.1 μs CP and the rest of 4.7 μs CP length for normal CP. For extend CP, there are 12 OFDM symbols with 16.7 μs CP length. If the subframe length is kept to be 1 ms, for 3.75 kHz OFDM symbol, 3 OFDM symbol can be filled in with 66.7 μs CP length. Some examples for other subcarrier spacing values can be found in Table 2. Observing Table 2, if subframe length is kept to be the same, the CP length may become longer with a smaller subcarrier spacing value. If the CP length is long enough, it may cover the maximum Round-Trip Time (RTT) in a cell plus maximum delay spread. For example, for the cell radius d=5 km/10 km/15 km, roughly need a CP length of 38 μs/71 μs/103 μs respectively. As a result, with a longer CP, no timing advance is needed. Some examples of the cell radius can be supported without timing advance can be supported are also given in Table 2 for different subcarrier spacing values with different CP lengths.

TABLE 2

Example of parameters for different subcarrier spacing values

| | Subcarrier spacing | | | | |
|---|---|---|---|---|---|
| | 15 kHz | 5 kHz | 3.75 kHz | 2.5 kHz | 1.25 kHz |
| OFDM symbol length | 66.7 μs | 200 μs | 266.7 μs | 400 μs | 800 μs |
| OFDM symbol number | 14 | 4 | 3 | 2 | 1 |
| CP length | 5.1 μs/ 4.7 μs | 50 μs | 66.7 μs | 100 μs | 200 μs |
| Cell radius (without TA) | NA | 7.5 km | 10.3 km | 15.8 km | 32.5 km |

Reference signal (RS) may be needed for demodulation within each resource block. For single carrier system (e.g., SC-FDMA for LTE uplink), data and RS can be TDM. For example, in LTE uplink system, two OFDM symbols are used as reference signal for PUSCH demodulation within one subframe. For smaller subcarrier value, the symbol length is longer, and this will result in larger overhead if one symbol is taken as reference signal. Reducing time domain reference signal density can reduce overhead. For example as shown in FIG. 8, for subcarrier spacing 800, symbol 802 is used as reference signal and in each subframe, there are two symbols used as reference signal; for subcarrier spacing 810, symbol 812 is used as reference signal and each subframe only has one symbol to be used as reference signal; for subcarrier spacing 820, symbol 822 is used as reference signal and every two subframes there is one symbol to be used as reference signal. Noted that, the subcarrier spacing values can be the different between the downlink subcarrier spacing and the uplink subcarrier spacing. Alternatively, they can also apply to the first uplink subcarrier spacing and the second uplink subcarrier spacing.

In another embodiment, the definition of the slot or subframe can be different for different subcarrier spacing values. Resource block is defined for resource allocation, as $N_{symb}$ consecutive SC-FDMA or OFDMA symbols in time domain and $N_{sc}^{RB}$ consecutive subcarriers in frequency domain. For example in LTE system the resource block parameters is shown in Table 3.

TABLE 3

Resource block parameters

| Configuration | $N_{sc}^{RB}$ | $N_{symb}$ |
|---|---|---|
| Normal cyclic prefix | 12 | 7 |
| Extended cyclic prefix | 12 | 6 |

Figure 9:
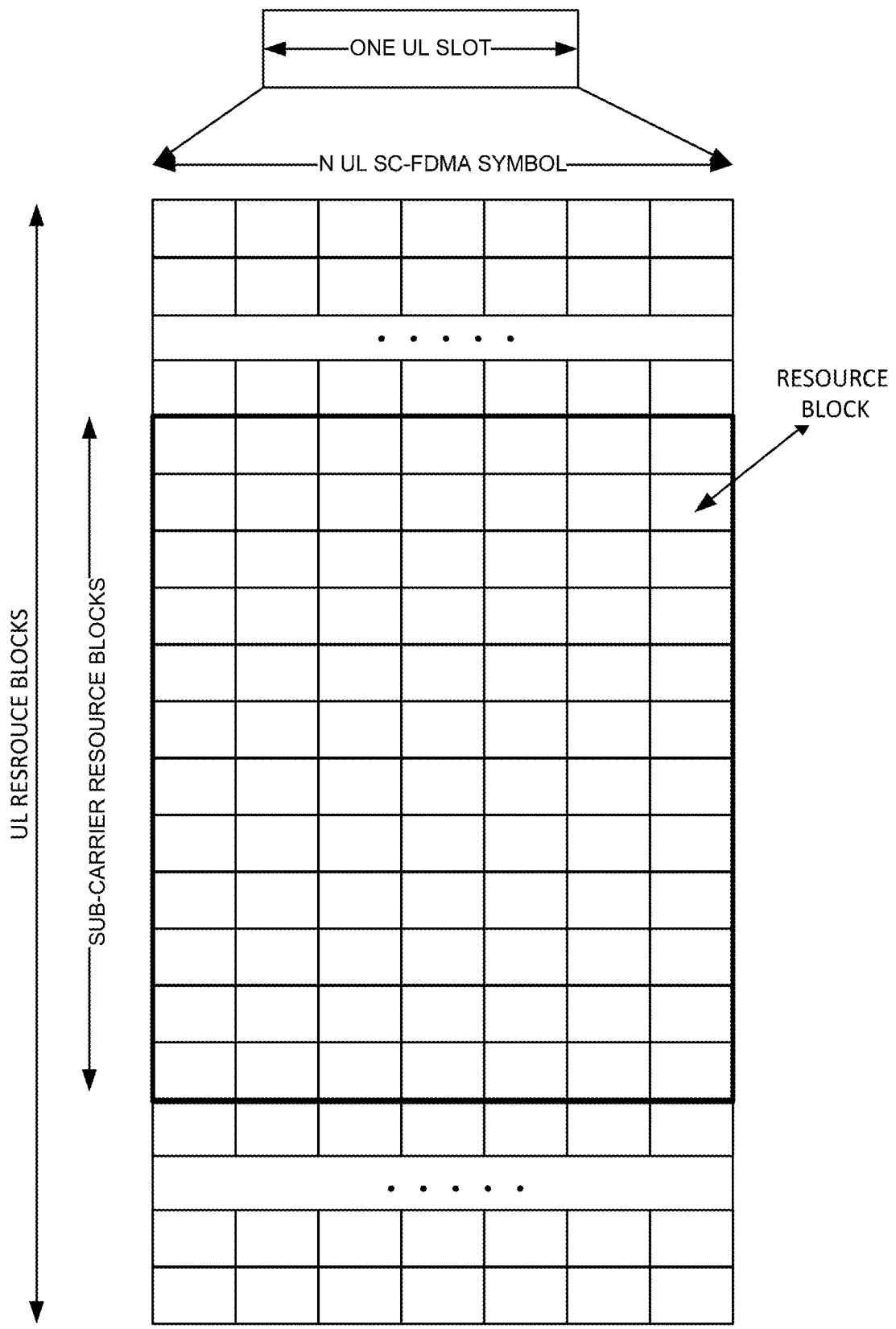
FIG. 9 illustrates an exemplary diagram of resource grid.

The transmitted signal in each slot is described by one or several resource grids of $N_{RB}^{UL} N_{sc}^{RB}$ subcarriers and $N_{symb}^{UL}$ SC-FDMA symbols. The resource grid is illustrated in FIG. 9. The quantity $N_{RB}^{UL}$ depends on the uplink transmission bandwidth configured in the cell and shall fulfil $$N_{RB}^{min,UL} \le N_{RB}^{UL} \le N_{RB}^{max,UL}$$

where $N_{RB}^{min,UL}=6$ and $N_{RB}^{max,UL}=110$ are the smallest and largest uplink bandwidths, respectively, supported by the current version of the specification in LTE.

Figure 10:
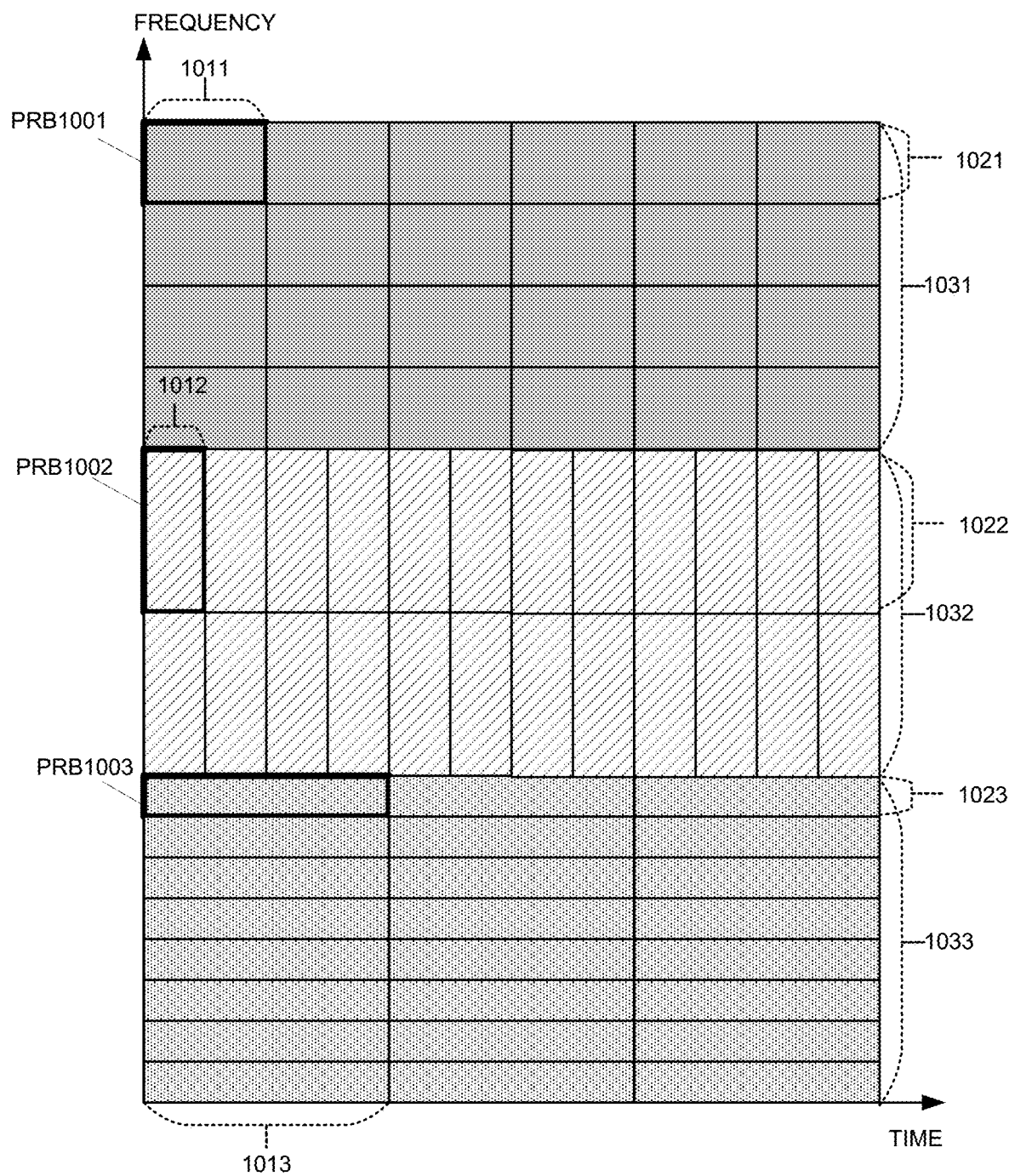
FIG. 10 illustrates exemplary diagrams of different definitions of resource block with different subcarrier spacing values in accordance with embodiments of the current invention.

FIG. 10 illustrates examples of different definition of resource block with different subcarrier spacing values according to the embodiments of current invention. For sub-carrier spacing 1021 in sub-band 1031, the subframe duration (i.e., the duration of Physical Resource Block (PRB) 1001) is 1011. Similarly, for subcarrier spacing 1022/1023 in sub-band 1032/1033, the subframe duration is 1012/1013 respectively for PRB 1002/1003. This kind of design is easy to support different requirement on latency, for example some short latency traffic may use a short subframe definition, which may need a large subcarrier spacing value and for the traffic that is not sensitive to delay, a long subframe definition can be introduced, which may go with a small subcarrier spacing value. Furthermore, long subframe definition is also beneficial for reference signal design if the density of reference signal in time domain is low. For example, 3 ms can be defined as one subframe for subcarrier spacing 1.25 kHz with one reference signal every subframe. Noted that, the different subcarrier spacing values can be the different between the downlink subcarrier spacing and the uplink subcarrier spacing. Alternatively, they can also apply to the first uplink subcarrier spacing and the second uplink subcarrier spacing.

Figure 11A:
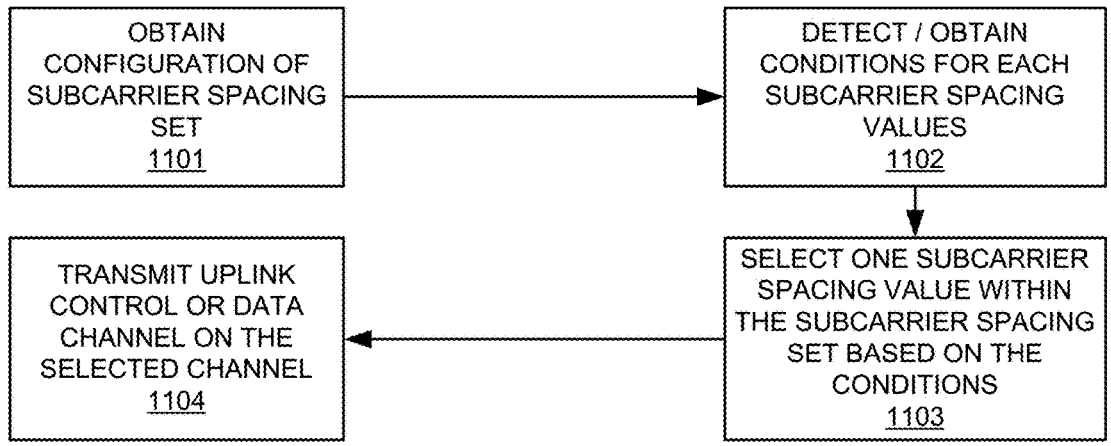
FIG. 11A illustrates top level flow chart for the UE and/or eNB to decide subcarrier spacing in accordance with embodiments of the current invention.

In the first embodiment, UE receives downlink channel and transmits uplink channel using different subcarrier spacing (i.e., uplink subcarrier spacing and downlink subcarrier spacing is different). In the other embodiment, eNB receives the first uplink channel from the first UE with the first uplink subcarrier spacing and the second uplink channel from the second UE with the second uplink subcarrier spacing. The uplink subcarrier spacing in the first embodiment or the second uplink subcarrier in the other embodiment can be configured by eNB or pre-defined in the specification. Alternatively, the first uplink subcarrier spacing or the second uplink sub-carrier spacing can be selected by UE. For example, a subcarrier spacing values set can be known by the UE, configured by eNB or written in the specification. UE can choose one of the subcarrier spacing values within the pre-known subcarrier spacing value set based on pre-known conditions. For example, if the channel condition (e.g., path loss, coverage) is within a range, then UE selects one of the subcarrier spacing values. In another example, if UE uses different transmission modes, then some corresponded subcarrier spacing values can be used, for example, for contention based uplink transmission, one subcarrier spacing value can be used and for scheduled uplink transmission another subcarrier spacing value is selected. In another example, if the TBS is in a range, UE uses subcarrier spacing value a, otherwise used subcarrier spacing value b. In another example, if the latency requirement is within a range, one particular subcarrier spacing value is chosen. FIG. 11A illustrates behaviors of UE and/or eNB to decide subcarrier spacing according to the embodiments of current invention. In another example, if UE belongs to a special UE category, one of the subcarrier spacing values in the subcarrier spacing set is selected. The pre-known conditions can be configured by RRC signaling or pre-defined in the specification. In one embodiment, UE obtains configuration of subcarrier spacing set in and corresponding sub-bands block 1101 and obtain the condition(s) for each subcarrier spacing values in block 1102. Then UE selects one subcarrier spacing value within the subcarrier spacing set based on the condition(s) in block 1103. UE transmits uplink control or data channel based on the selected one subcarrier spacing value in block 1104.

Figure 11B:
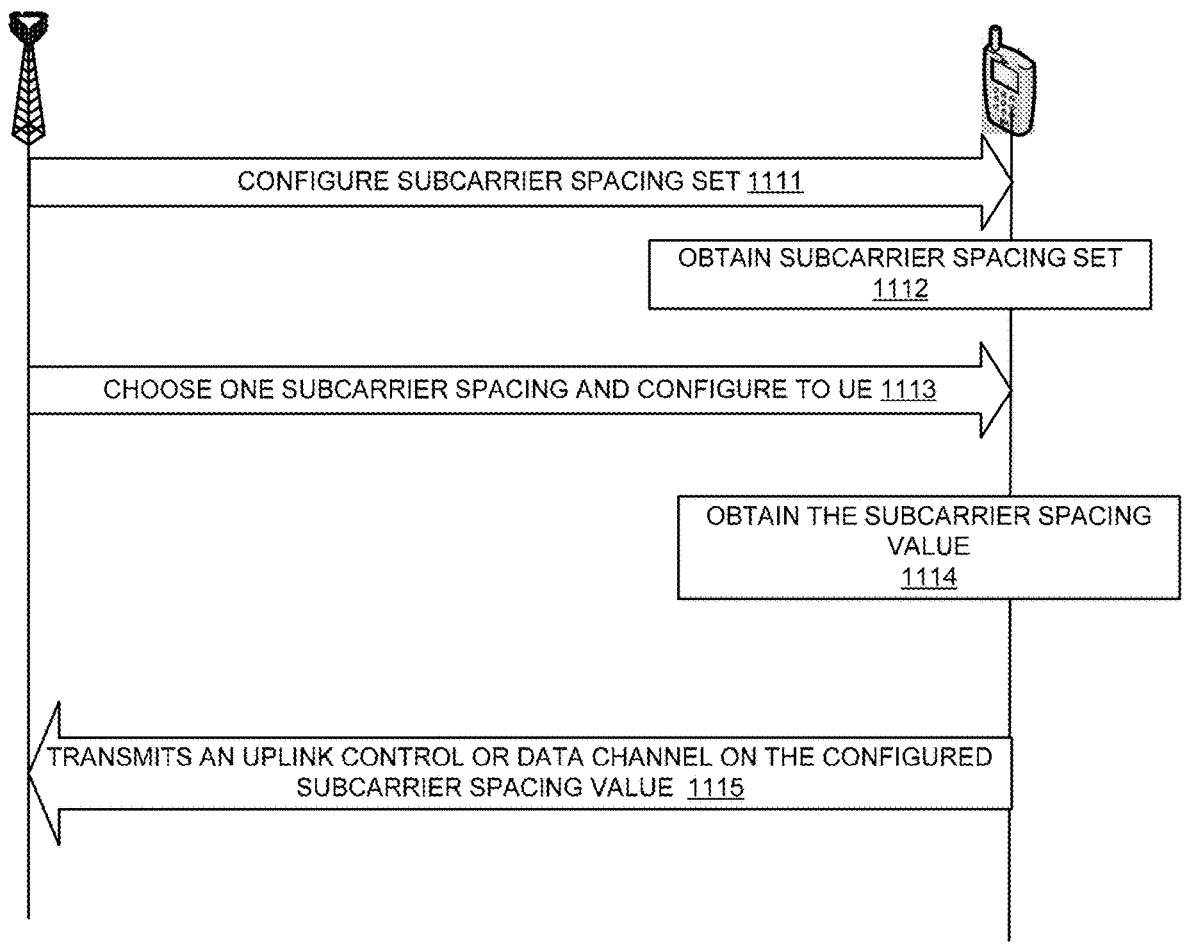
FIG. 11B illustrates an exemplary diagram of UE and/or eNB to decide subcarrier spacing in accordance with embodiments of the current invention.

FIG. 11B illustrates behaviors of UE and/or eNB to decide subcarrier spacing according to the embodiments of current invention. The above condition(s) can be used by eNB and there is no need to configure the above condition(s) to UE. That is, eNB selects one subcarrier spacing value based on one or the combination of the above conditions. In one embodiment, eNB configures a subcarrier spacing set to UE in step 1111 and then eNB selects one subcarrier spacing value within the subcarrier spacing set based on the condition(s) and configures to UE in step 1113. UE obtains the subcarrier spacing set from eNB in step 1112. Then UE obtains the one subcarrier spacing value from eNB in step 1114. UE transmits an uplink control or data channel on the configured one subcarrier spacing value to the eNB in step 1115.

Figure 11C:
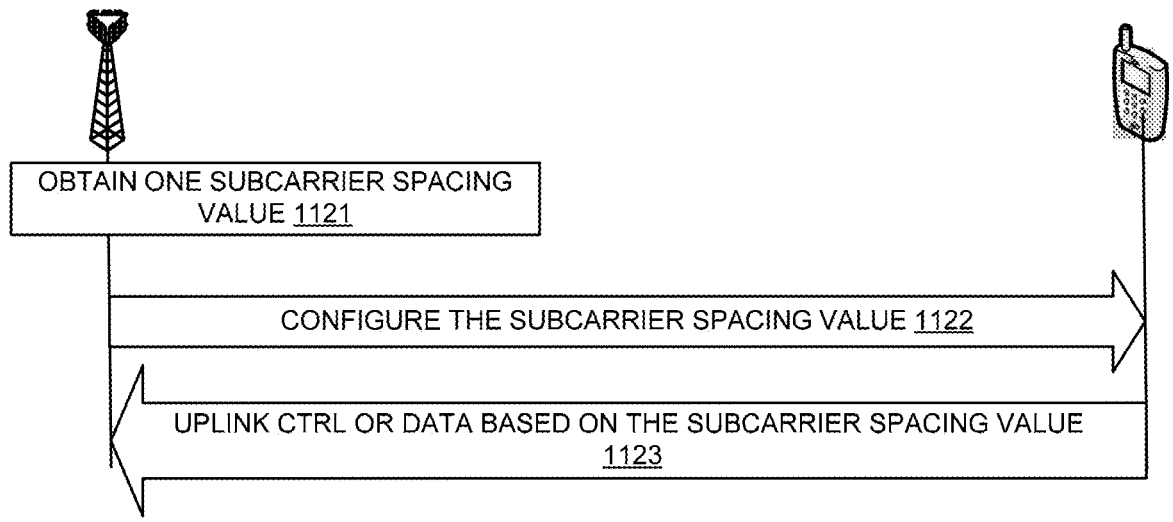
FIG. 11C illustrates behaviors of UE and/or eNB to decide subcarrier spacing in accordance with embodiments of the current invention.

FIG. 11C illustrates behaviors of UE and/or eNB to decide subcarrier spacing according to the embodiments of current invention. In this embodiment, eNB selects one subcarrier spacing value within the subcarrier spacing set based on the condition(s) in step 1121 and directly configures to UE about the selected one subcarrier spacing value in step 1122. And UE obtains the one subcarrier spacing value and then transmits uplink control or data channel on the configured one subcarrier spacing value to the eNB in step 1123. This one subcarrier spacing value can be the uplink subcarrier spacing or the second uplink carrier spacing. From UE perspective, UE may only get one uplink subcarrier spacing, but from eNB perspective, some UE may use the first uplink subcarrier spacing and others may use the second subcarrier spacing. In the following text, the mechanism for UE to obtain uplink subcarrier spacing also applies to UE to obtain the first or the second uplink subcarrier spacing.

Figure 12A:
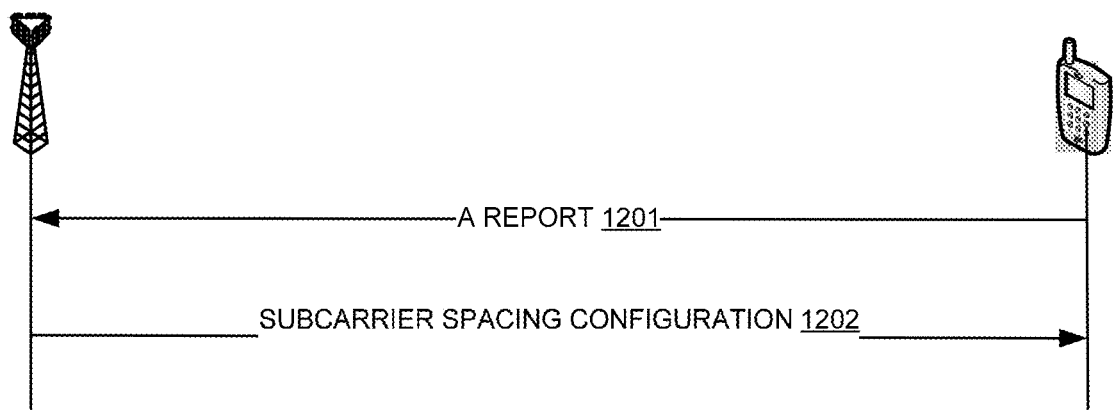
FIG. 12A illustrates an exemplary diagram of the eNB acquires information of UEs to decide subcarrier spacing in accordance with some embodiments of the current invention.
Figure 12B:
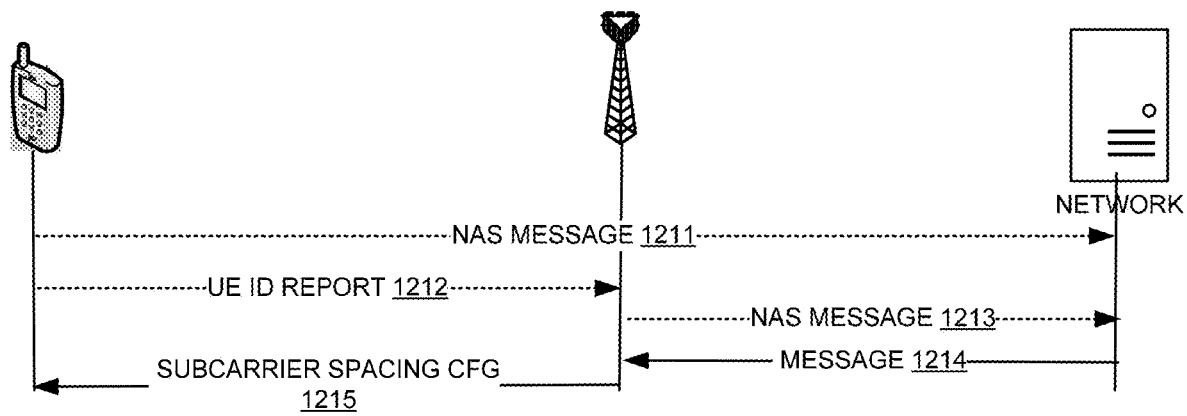
FIG. 12B illustrates an exemplary diagram of the eNB acquires information of UEs to decide subcarrier spacing in accordance with some embodiments of the current invention.

If eNB decides the UEs who use the uplink subcarrier spacing which is different from the downlink subcarrier spacing, or the UEs who use the second uplink subcarrier spacing, eNB needs to get some information of the UEs. FIG. 12A and FIG. 12B give two examples of how eNB acquires information of UEs to decide subcarrier spacing according to the embodiments of current invention. In the example of FIG. 12A, UE sends a report to eNB in step 1201 and eNB indicates the UE the subcarrier spacing configurations based on the report from the UE in step 1202. The report may include at least one of the condition(s) mentioned above such as channel condition, UE category, transmission mode, etc. In another example of FIG. 12B, eNB obtains a message from core network in step 1214, the message could be a NAS message, and based on the message from core network, eNB indicates the subcarrier spacing to the UE in step 1215. Before that, UE may need to report UE identity (ID) information to eNB in step 1212 so that eNB can ask for the message from core network for the UE in step 1213. Alternative, core network can acquire UE information directly from UE which is transparent to eNB, and then core network send eNB the message in step 1211, based on which eNB configure UE the subcarrier spacing.

The uplink subcarrier spacing or the second uplink subcarrier spacing can be pre-defined in order to reduce the signaling overhead and complexity of eNB. In order to increase the flexibility, in another embodiment, the uplink subcarrier spacing is configured to the UE by higher layer signaling (e.g., in system information or RRC signaling). Alternatively, UE can receive an uplink assignment message to obtain the uplink subcarrier spacing of the uplink resource elements or obtains the uplink subcarrier spacing information with both higher layer singling and physical layer signaling. Sometimes, UE needs to obtain the uplink subcarrier spacing information with both higher layer singling and physical layer signaling. For example, UE receives a uplink sub-carrier spacing value set in a higher layer signaling, e.g., in SI, and the uplink subcarrier spacing is indicated by a physical layer signaling, e.g. in DCI. Alternatively, the uplink subcarrier spacing value set can be pre-defined and known to the UE. Another example for UE to obtain the uplink subcarrier spacing is that UE obtain the uplink subcarrier spacing information by obtaining the radio resource region (e.g., a sub-band) for its uplink transmission. UE obtains the uplink subcarrier spacing value set and the radio resource region corresponding to each uplink subcarrier spacing in the uplink subcarrier spacing set.

Figure 13:
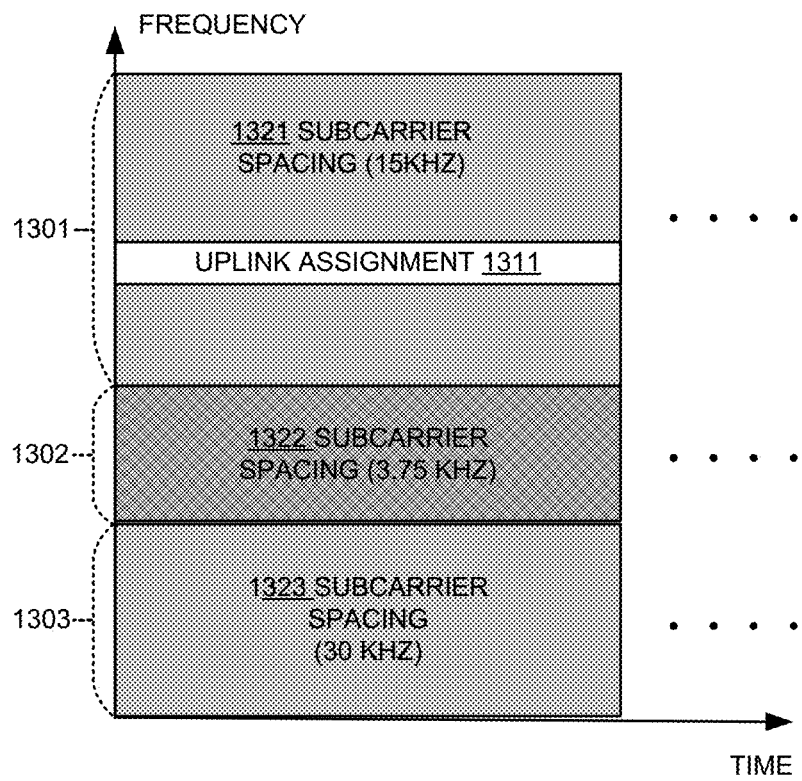
FIG. 13 illustrates an exemplary diagram of radio resource regions for different subcarrier spacing values in accordance with embodiments of the current invention.

FIG. 13 illustrates an example of radio resource regions for different subcarrier spacing values with some embodiments of current invention. In one embodiment of the disclosure, a method for a UE to transmit a waveform, the method comprising: transmitting a uplink channel carrying uplink data channel or control channel modulated with one subcarrier spacing value 1321, e.g., 15 kHz, within a pre-known subcarrier spacing value set, such as a subcarrier spacing value set of {3.75 kHz, 15 kHz, 30 kHz}. The pre-known subcarrier spacing set can be configured by RRC signaling (e.g., in system information), or alternatively, the subcarrier spacing values are defined in the specification. In one embodiment of the disclosure, each subcarrier spacing value in the pre-known subcarrier spacing value set {3.75 kHz, 15 kHz, 30 kHz} associate with one radio resource region, for example, sub-band 1301 is used for subcarrier spacing value 1321, i.e. 15 kHz, sub-band 1302 is used for subcarrier spacing value 1322, i.e. 3.75 kHz and sub-band 1303 is used for subcarrier spacing value 1323, i.e. 30 kHz. This corresponded radio resource region can also be configured by RRC signaling (e.g., in system information), which can be changed semi-statically. Alternatively, the corresponded radio resource region can be defined in specification. UE transmit uplink channel on an uplink assignment 1311 with one subcarrier spacing value 15 kHz on sub-band 1301.

Figure 14:
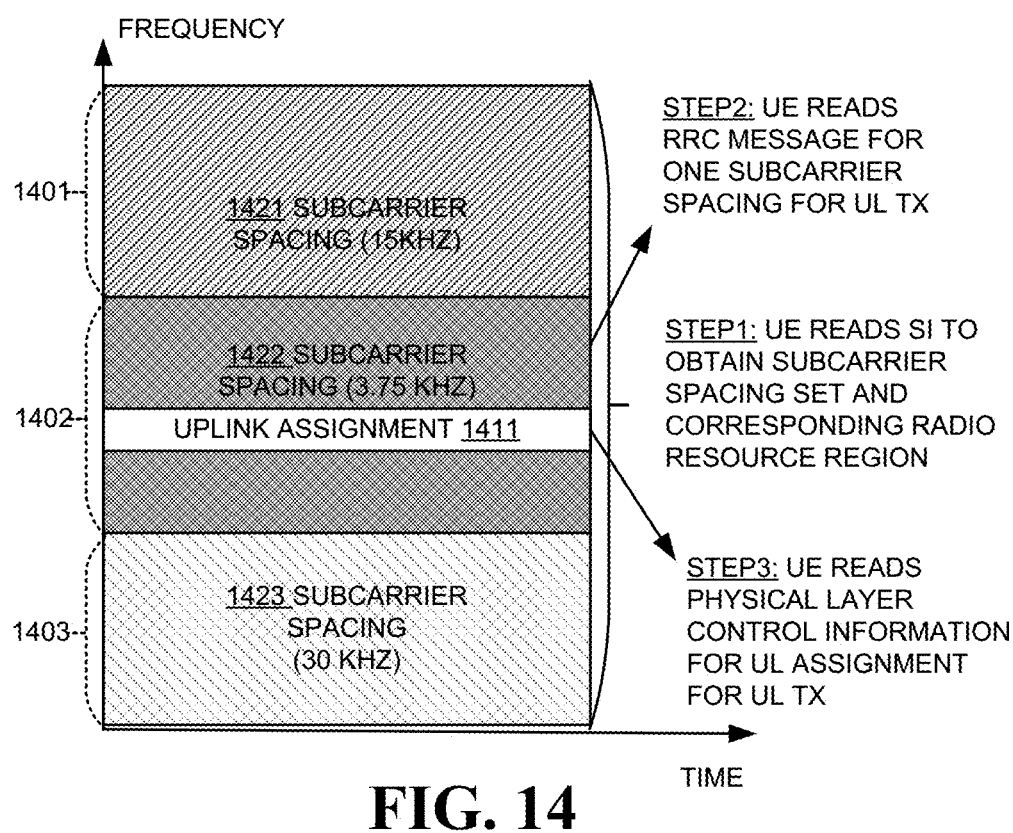
FIG. 14 illustrates an exemplary diagram of how UE obtaining the uplink configurations including radio resource regions for different subcarrier spacing values and uplink assignment in accordance with embodiments of the current invention.

FIG. 14 illustrates an example of how UE obtaining the uplink configurations including radio resource regions for different subcarrier spacing values and uplink assignment with some embodiments of current invention. In one embodiment, UE reads SI to obtain subcarrier spacing value set and corresponding radio resource regions for each sub-carrier spacing value. For example, UE learns that for sub-band 1401, 1402 and 1403, the corresponding subcarrier spacing value is 1421, i.e. 15 kHz, 1422, i.e. 3.75 kHz and 1423, i.e. 30 kHz respectively. UE receives RRC message, which configures the one subcarrier for UE to transmit uplink. For example, in FIG. 14, sub-carrier spacing value 1422 equal to 3.75 kHz is configured to UE with the corresponding sub-band 1402. Since the relationship between sub-band and subcarrier spacing value is given in SI, either subcarrier spacing value or sub-band can be configured in RRC message for the one sub-carrier spacing value for uplink transmission. eNB will give an assignment for uplink transmission. In one example, the uplink assignment is indicated in physical layer control information. In FIG. 14, the uplink assignment 1411 is indicated in physical layer control information. With all the above information, such as the one subcarrier spacing value, sub-band information, uplink assignment, UE transmit uplink waveform based on the above information.

Figure 15A:
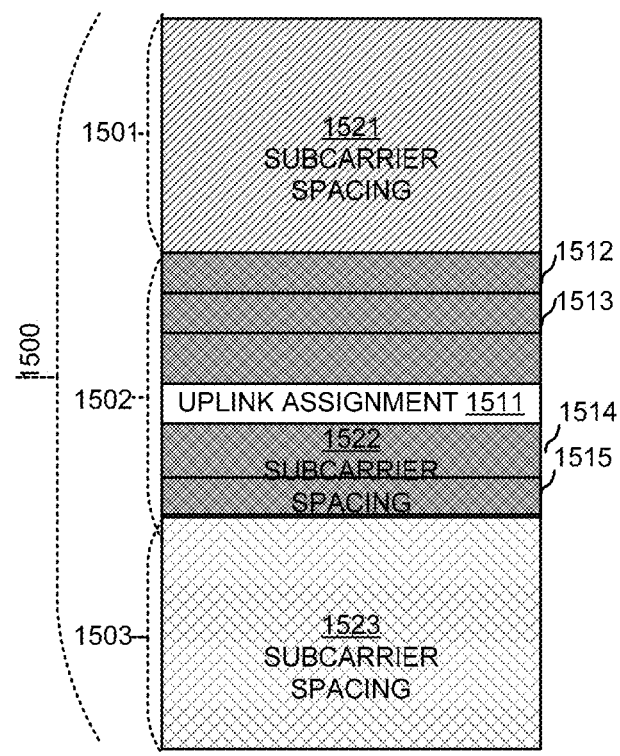
FIG. 15A illustrates an exemplary diagram of UL assignment indication to the UE for the uplink subcarrier spacing or the second uplink subcarrier spacing in accordance with embodiments of the current invention.
Figure 15B:
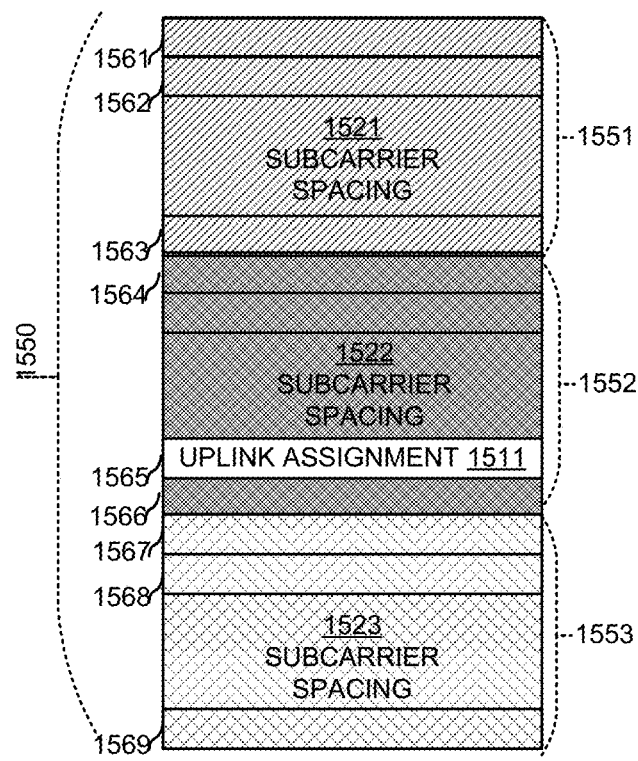
FIG. 15B illustrates an exemplary diagram of UL assignment indication to the UE for the uplink subcarrier spacing or the second uplink subcarrier spacing in accordance with embodiments of the current invention.

In one embodiment, the sub-band can be pre-known to the UE (e.g., through RRC message) when the UE get an uplink assignment, the resource allocation in the physical layer control information can only indicate the relative location within the sub-band. For example, FIG. 15A and FIG. 15B illustrates examples of UL assignment indication to the UE according to the embodiments of current invention. UE can obtain system bandwidth 1500 and sub-band bandwidth 1501, 1502 and 1503 for each sub-band 1501, 1502, and 1503 with subcarrier spacing 1521, 1522 and 1523 respectively in broadcasting channel or UE-specific message. Furthermore, UE receives a RRC message to configure UE to use sub-band 1502 for subcarrier spacing 1522 and then UE may know the relative sub-band location as well as the sub-band frequency. UE may receive an UL assignment in physical layer control information (e.g., DCI). In the control information, the UL assignment 1511 is given by one or more physical resource block (PRB) index, wherein each of the PRB index is defined within sub-band 1502 from PRB 1512 to PRB 1515. For example, the uplink assignment is PRB 1514 in FIG. 15A.

In another embodiment of FIG. 15B, UE obtains system bandwidth, subcarrier spacing values and corresponding sub-band by UE-specific RRC message or broadcast or group-cast channel. The PRB index is defined through the whole system bandwidth 1550. With the information in UE-specific RRC message or broadcast or group-cast channel, UE knows the sub-band for each subcarrier spacing value, for example as FIG. 15B shown, sub-band 1551 (i.e., PRB 1561 to PRB 1563) is for subcarrier spacing 1521; sub-band 1552 (i.e., PRB 1564 to PRB 1566) is for subcarrier spacing 1522; and sub-band 1553 (i.e., PRB 1567 to PRB 1569) is for sub-carrier spacing 1523. Before uplink transmission, UE will receive an uplink assignment with PRB index(es) for uplink transmission, for example from a DCI. In this case, UE does not need to know which sub-band or subcarrier spacing is used for uplink transmission, because it is indicated by PRB index(es) in the uplink assignment. For example in FIG. 15B, UL assignment 1511 is PRB 1565, which allocates in sub-band 1552 with subcarrier spacing 1522.

Figure 16:
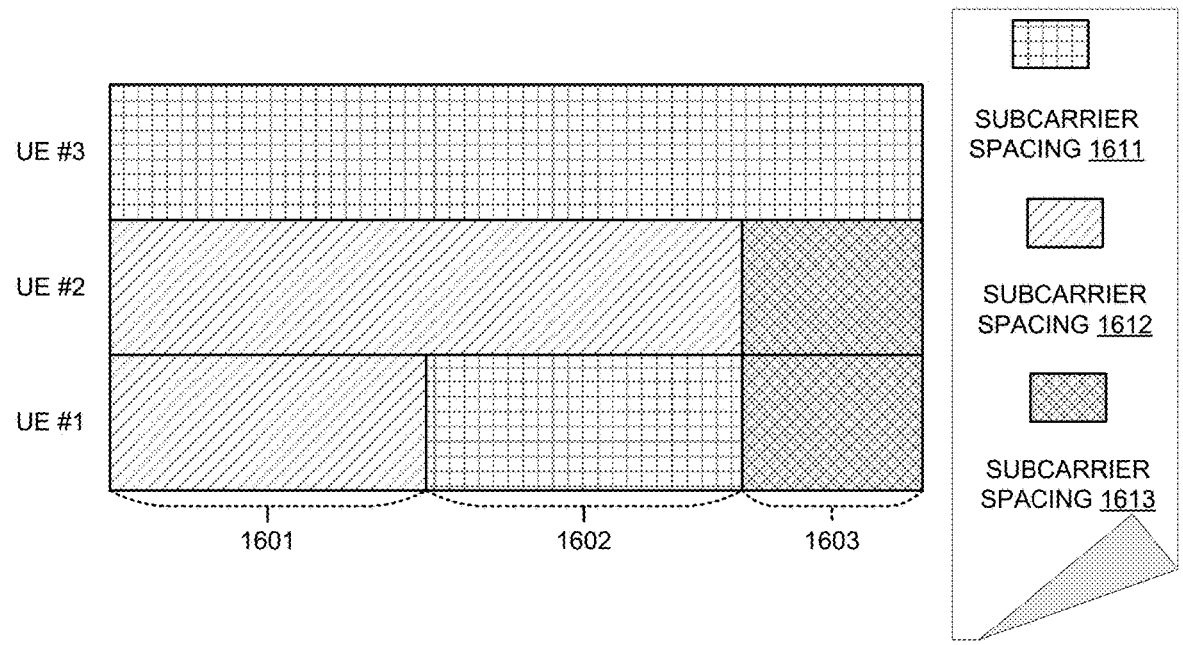
FIG. 16 illustrates some exemplary diagrams of subcarrier spacing configuration for different UEs with some embodiments of the current invention.

FIG. 16 illustrates some examples of subcarrier spacing configuration for different UEs according to some embodiments of current invention. As mentioned previously, the sub-carrier spacing value and corresponded radio resource region can be UE-specific. This means on the same radio resources, different UEs may transmit uplink data or control channel with different sub-carrier spacing values. For example as FIG. 16 shown, UE #1 considers sub-band-0 1601, sub-band-1 1602 and sub-band-2 1603 used for subcarrier-spacing-0 1612, subcarrier-spacing-1 1611 and subcarrier-spacing-2 1613 respectively. UE #2 considers subband #0 1601 and sub-band #1 1602 all used for subcarrier-spacing-0 1612 and sub-band #2 1603 used for subcarrier-spacing-2 1613. However, for UE #3, all the sub-band #0 1601, sub-band #1 1602 and sub-band #2 1603 are used for subcarrier-spacing-1 1611. Also noted that, for UE#3, there may not be sub-band concept but considering subcarrier-spacing-1 1611 for the whole system bandwidth. Alternatively, the corresponded radio resource region can be cell-specific, which means all the UEs will transmitted uplink waveform with the same subcarrier value in that region. For example, all the UE considers sub-band 0/1/2 used subcarrier spacing 0/1/2 respectively as UE#1. In another word, from eNB perspective, the subcarrier spacing for the same sub-band can be changed, e.g., subcarrier spacings can be different in different radio frames or multiple subframes.

Figure 17:
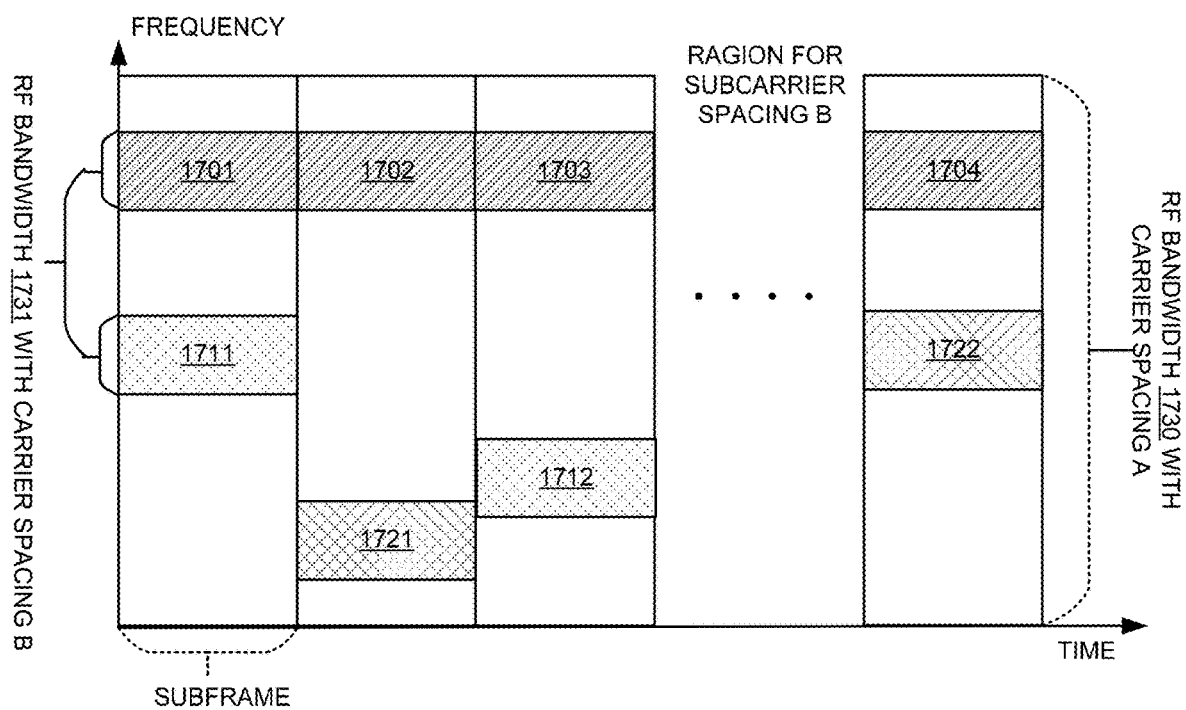
FIG. 17 illustrates some exemplary diagrams of resource allocations for different sub-carrier spacing in accordance with some embodiments of the current invention.

FIG. 17 illustrates some examples of resource allocations for different subcarrier spacing with some embodiments of current invention. In one embodiment, there is one type of UE, type I UE, whose RF bandwidth 1730 with subcarrier spacing a, and another type of UE, type II UE, whose RF bandwidth 1731 with subcarrier spacing b in the system. Subcarrier spacing a can be same or different with b. eNB can configure the regions (i.e. frequency location) to the corresponding type of UE by RRC message, e.g., within system information, and UE can obtain this information from eNB. Alternatively, UE can know this information in specification. For type I UE, it will know the whole RF bandwidth 1730 can be used with subcarrier spacing a. eNB can make sure different types of UE with different subcarrier spacing values and/or RF bandwidths are scheduled to one the right region. For example, type I UE may consider all RF bandwidth 1730 can be used for itself. Alternatively, UE can know all the regions for all types of UE with different RF bandwidths and/or different subcarrier spacing values so that UE can learn which region is for itself. For example, type I UE can know the region 1701, 1702, 1703, 1704, 1711, 1721, 1712 and 1722 are for other type of UEs.

For type II UE with RF bandwidth 1731, resource region for RF bandwidth 1731 can be same (e.g., 1701-1704) or different (e.g., 1711, 1721, 1712, 1722) in each subframe. Alternatively, the resource region for RF bandwidth can be different (e.g., hopping to a different sub-band) in another subframe bundling (i.e., several continuous subframes). Also noticed that, for type II UE, the definition of subframe can be different from other type of UEs. If UE RF bandwidth is small, e.g., RF bandwidth 1731, it may require tuning time to hop to a different frequency band. A discontinues subframe set can be defined for one UE to support frequency hopping, such as 1711 and 1712 belongs to one subframe set and 1721 and 1722 belongs to another subframe set, so that UE can have enough time for frequency retuning. eNB can configure different subframe set to different groups of UEs and no cell throughput loss is expected if there are enough UEs in a cell. For example, eNB can configure subframe set 1711 and 1712 to the UEs whose UE ID ends up with odd and subframe set 1721 and 1722 to the UEs whose UE ID ends up with even. The configuration with or without frequency hopping can be supported in the same time by one eNB. UE can transmit or retransmit one transport block in two or more subframes in the frequency hopping subframe set, so that frequency diversity gain can be obtained. In another embodiment, one transport block is transmitted within one subframe.

Figure 18:
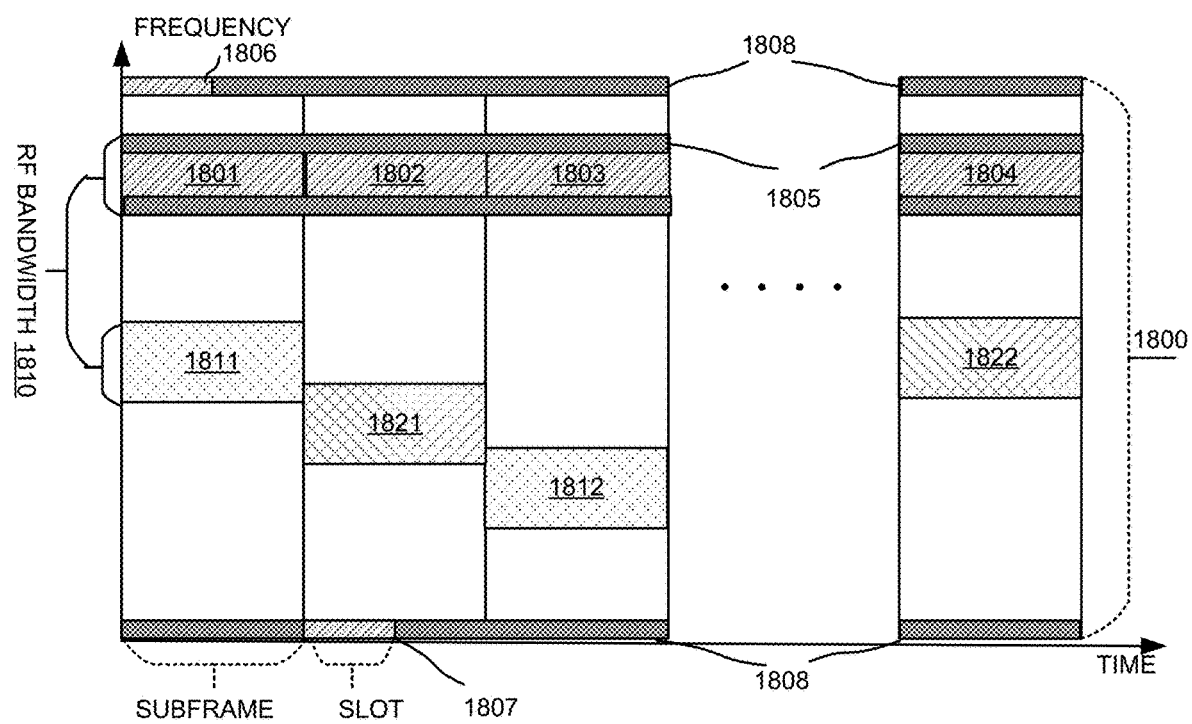
FIG. 18 illustrates some exemplary diagrams of control channel design for narrow RF bandwidth UEs in accordance with some embodiments of the current invention.

In LTE system, uplink control channel, i.e. PUCCH, is allocated at the edges of the uplink system bandwidth. For the UE whose RF bandwidth is smaller than the system bandwidth may need a new design for PUCCH. FIG. 18 illustrates some examples of control channel design for narrow RF bandwidth UEs with some embodiments of current invention. In one embodiment, the control channel allocated at the edges 1805 of RF bandwidth 1810 or any pre-known frequency location within RF bandwidth. This means control channel is FDM with data channel within the RF bandwidth. In another embodiment, the control channel allocated at any frequency location within the system bandwidth 1800, such as 1806 and 1807, which may overlap with other type UEs with the same RF bandwidth as system bandwidth 1800. In LTE system, PUCCH hops within two slots in one subframe. However, narrow RF bandwidth type UE needs some time to retuning to a different frequency; therefore in order to obtain similar frequency diversity gain, one slot has to be used as a guard period for retuning. For example, 1806 and 1807 are used for PUCCH for one UE with RF bandwidth 1810, where 1806 and 1807 are in the first slot of different subframes. Two UEs can be paired to occupy the PUCCH region in two subframes without losing spectral efficiency. For example, another UE can use the second slot after 1806 and 1807.

In another embodiment, some resource blocks can be used for control channel and the other resource blocks can be used for data channel, i.e., TDM between control channel and data channel resource region not only from UE perspective but also from system perspective. For example, resource block 1811 and 1812 can be used for control channel transmission and resource block 1821 and 1822 can be used for data channel transmission. The resource blocks for data channel or control channel are pre-known to UE. For example, they can be configured by eNB or based on some pre-defined rules such as subframe index or UE ID. The frequency location of resource blocks for control channel or data channel can be the same (e.g., resource block 1801, resource block 1802) or different (e.g., resource block 1811 and resource block 1812) in different subframes. Furthermore, the resource blocks for control channel or data channel can be cell-specific or UE-specific. For example, all the UE can use the resource block 1811 and 1812 for control channel transmission which cannot be used for data transmission. Considering UE may not transmit data channel and control channel in the same time, two resource blocks can be defined within one subframe for one UE. For example, resource block 1811 is configured to transmit control channel and resource block 1801 is used to transmit data channel. UE may also need retuning between different subframes if different frequency location is used for the resource block UE will use to transmit data or control channel.

Figure 19:
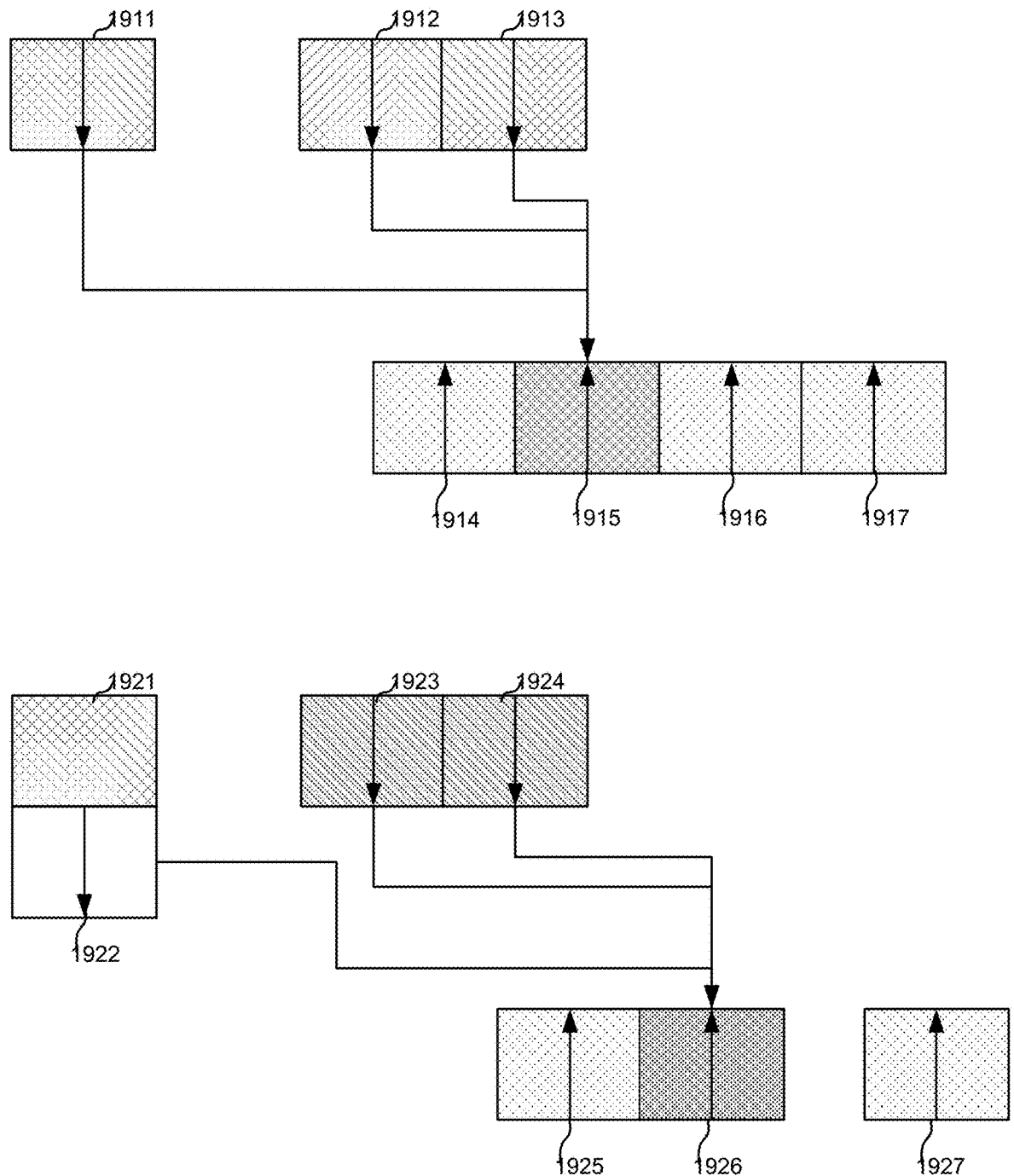
FIG. 19 illustrates some exemplary diagrams of HARQ timing in accordance with some embodiments of the current invention.

New HARQ timing may need to be introduced for FDD system if only some of subframes are allowed to transmit control channel. FIG. 19 illustrates some examples of HARQ timing with some embodiments of current invention. If only some of subframes or resource blocks are allowed to transmit control information, such as HARQ feedback, CSI feedback, scheduling request information, all the HARQ feedback and/or other control information for one UE, e.g., the HARQ feedback for downlink transmission 1911, 1912 and 1913 are multiplexed together in the same resource block or subframe 1915, which is used for control channel transmission. In another example, all HARQ feedbacks and/or other control information for all the UEs, who are configured to use the same resource block 1926, are transmitted on that resource block 1926. For example, 1921 and 1924 is for the same UE and 1922 and 1923 is for different UEs. The multiplexing method between the HARQ feedbacks from the same or different UEs can be CDM, FDM and TDM.

PRACH channel may also need a new design for the narrow band UE or the UE using the second subcarrier spacing. As discussed previously, the smaller subcarrier spacing can have a longer CP without increase overhead. For example shown in Table 2, 3.75 kHz subcarrier spacing can have 66.7 µs CP length which can cover 10.3 km cell radius without timing advance. On the other hand, for the UE in bad coverage, e.g., 15 dB coverage hole, dozens of repetitions of PRACH are needed to bridge the coverage gap. PRACH resources need to be reserved because eNB does not know when UE will send a preamble sequence on the PRACH resources. Six PRBs bandwidth are reserved for PRACH in current LTE system to provide a 1 µs timing resolution due to current CP length is too small. Different random access preamble formats are designed for different cell radius with different length of CP. For example, format-2 with CP length of ~0.2 ms can cover about 29 km cell radius. Some resources are configured to UE for PRACH. If UE in coverage enhancement mode and normal coverage UE are served with in the same cell, different resource needs to be reserved (FDM or TDM) otherwise eNB cannot successful detect the UE in coverage enhancement mode because the receiving signal is too wake and will drown in signal from normal coverage UE even with different sequence.

Figure 20:
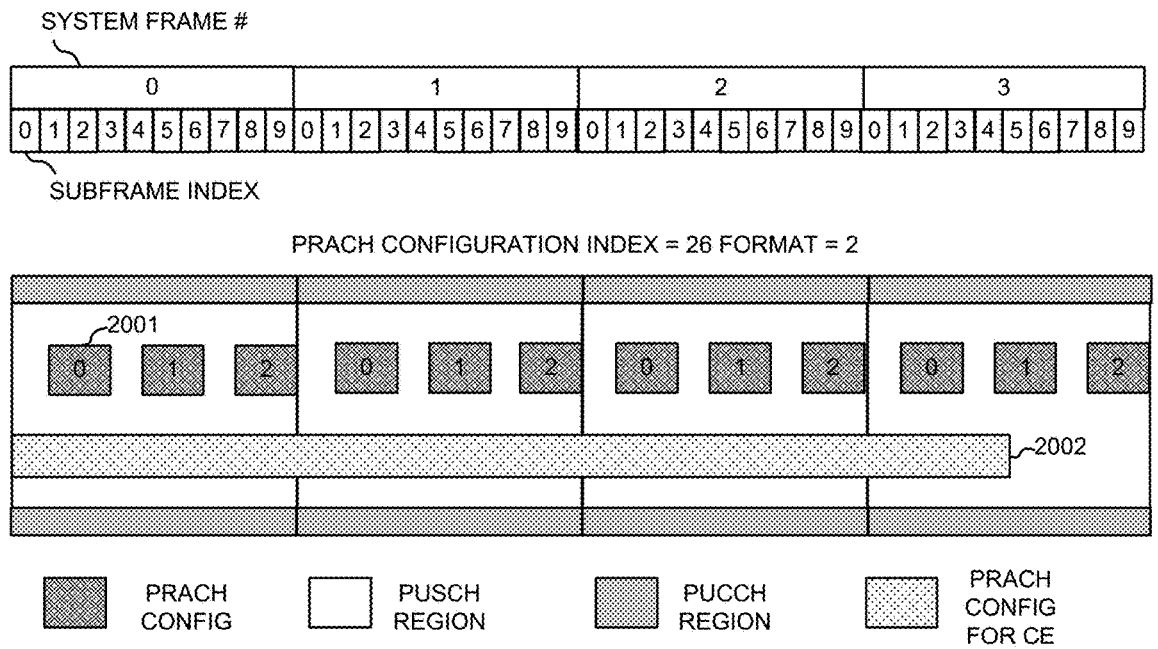
FIG. 20 illustrates some exemplary diagram of PRACH configuration for normal coverage UE and coverage enhancement mode UE with some embodiments of the current invention.

FIG. 20 illustrates some examples of PRACH configuration for normal coverage UE and coverage enhancement mode UE with some embodiments of current invention. PRACH resources are reserved for normal UE can coverage enhancement (CE) mode UE and the resource 2001 for normal UE and 2002 for CE mode UE are FDM. Since repetitions are needed to bridge the coverage gap, the PRACH resource for CE mode UE covers several subframes, e.g. 32 subframes for resource 2002. For the scenario we discussed in this disclosure, which different UEs may use different uplink subcarrier spacing, or different UEs may have different RF bandwidth, it is quite challenge to reuse the current PRACH design (with or without repetition of PRACH). Some new design of PRACH is needed. One solution for PRACH new design is reusing current PRACH channel structure but boosting into a smaller bandwidth, e.g., 1 PRB. With longer CP, boosting to a narrow bandwidth is possible because the requirement of timing resolution is not that strict. Some error is allowed which can be covered by longer CP.

Figure 21:
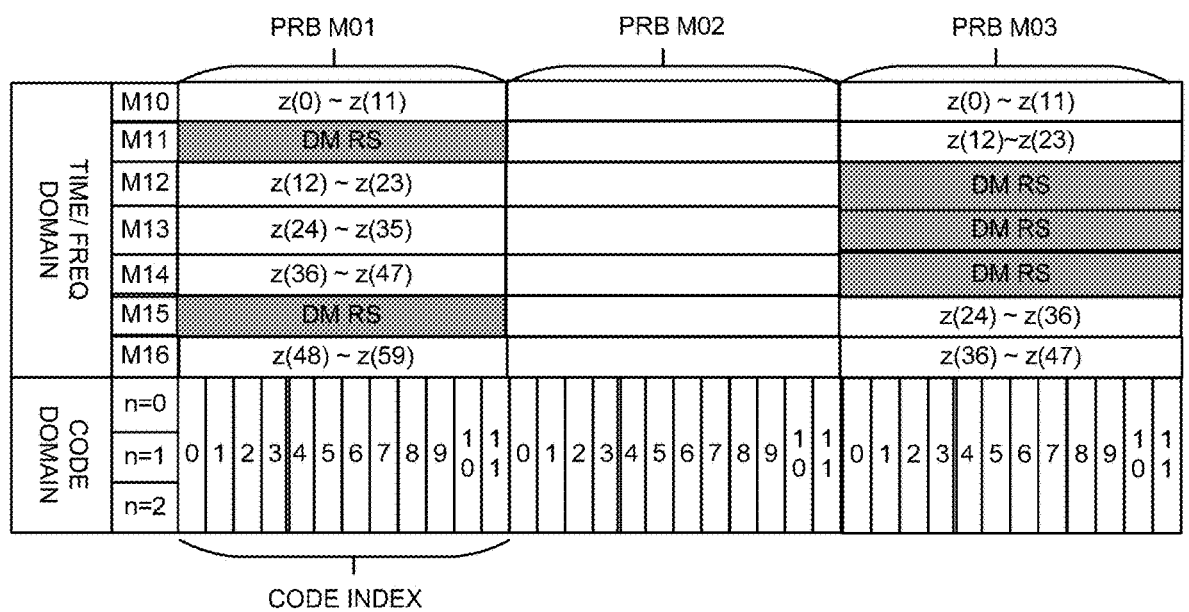
FIG. 21 illustrates some exemplary diagrams of PUCCH resource in time-frequency domain and code domain with some embodiments of the current invention.

Another solution is no need to have PRACH channel since TA may be eliminated with long CP for uplink control and uplink data channel. In another word, an uplink control channel or data channel can be sent directly with a long CP. Preamble can be added before the uplink control channel of data channel to simply the detection of eNB. The functionality of PRACH can be replaced by PUCCH. Some resources in PUCCH can be reserved for contention based uplink transmission with 1-bit information. Random access response can be transmitted after receiving the 1-bit information in the reserved PUCCH. Similar message 3 and contention resolution as current LTE system can be used to further identify UE and solves the contention if different UEs choose the same resource in PUCCH. FIG. 21 illustrates some examples of PUCCH resource in time-frequency domain and code domain according to embodiments of current invention. Some symbols can be used for reference signals for demodulation as (m01, m10), (m01, m15), (m03, m12), (m03, m12), and (m03, m12). For 1-bit information for either PUCCH or PRACH can choose one resource from a resource pool, such as (code 1, m01, m10). Since different 1-bit information come from different UEs, the reference signals also need to be orthogonal and associate one resource within the resource pool. Some resources are reserved for contention based 1-bit information to implement the functionalities for PRACH, for example, PRB m01 can be reserved for the 1-bit information. Since different UE may pass different channels, different resource groups can be design for UE in different channel conditions, e.g., PRB m01 is for good coverage UE and PRB m02 is for bad coverage UE. Further, within PRB m01, some codes are reserved for 1-bit contention information and the others are for HARQ, CSI feedback or SR with configured or pre-known resources.

Figure 22:
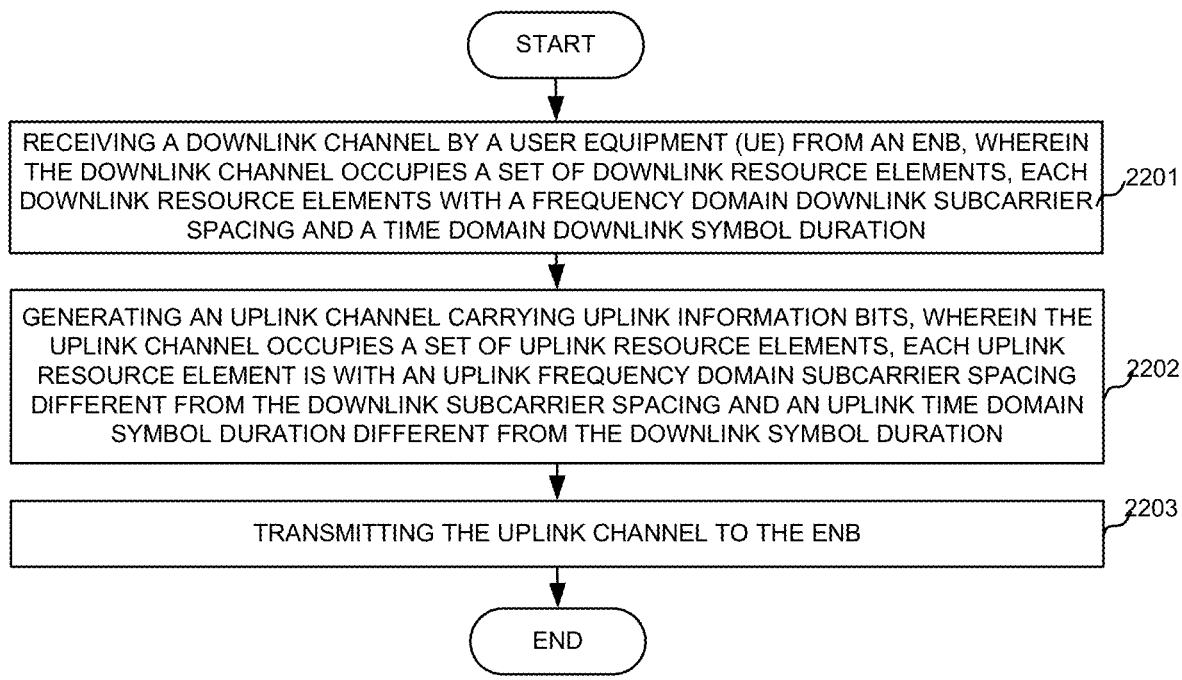
FIG. 22 shows an exemplary flow chart for a UE to generate the uplink channel occupies a set of uplink resource elements that are different from the downlink resource elements in accordance with embodiments of the current invention.

FIG. 22 shows an exemplary flow chart for a UE to generate the uplink channel occupies a set of uplink resource elements that are different from the downlink resource elements in accordance with embodiments of the current invention. At step S201, the UE receives a downlink channel from an eNB, wherein the downlink channel occupies a set of downlink resource elements, each with a frequency domain downlink subcarrier spacing and a time domain downlink symbol duration. At step S202, the UE generates an uplink channel carrying uplink information bits, wherein the uplink channel occupies a set of uplink resource elements, each with an uplink frequency domain subcarrier spacing different from the downlink subcarrier spacing and an uplink time domain symbol duration different from the downlink symbol duration. At step S203, the UE transmits the uplink channel to the eNB.

Figure 23:
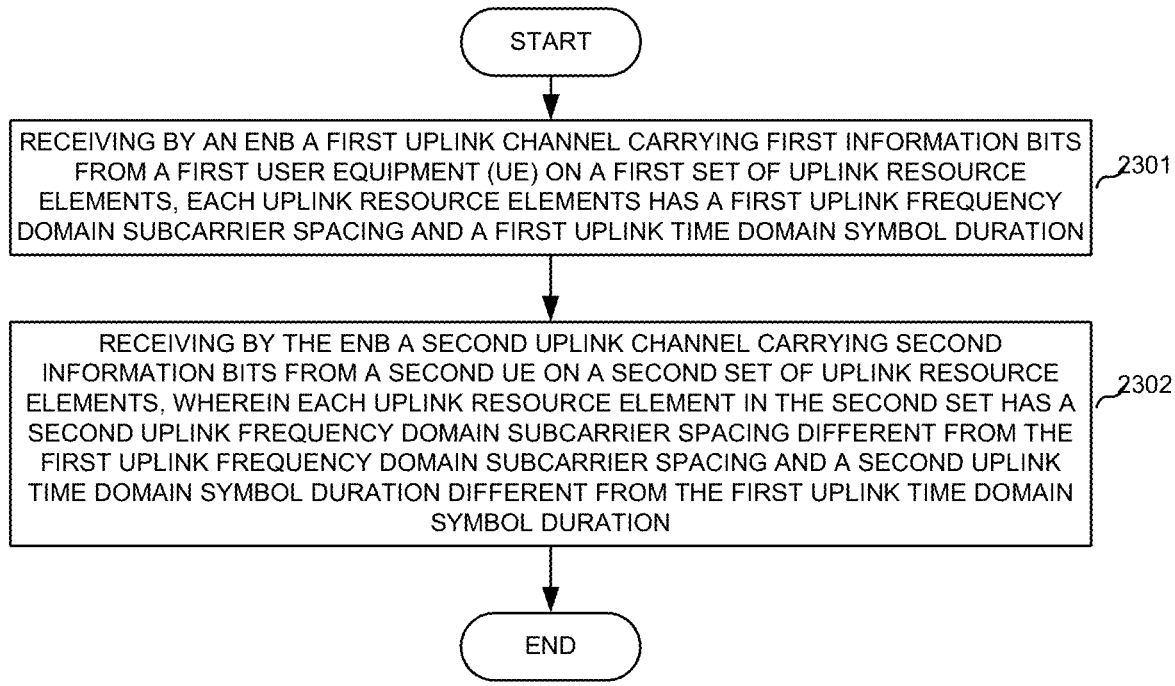
FIG. 23 shows an exemplary flow chart for a base station to handle the uplink channel occupies a set of uplink resource elements that are different from the downlink resource elements in accordance with embodiments of the current invention.

FIG. 23 shows an exemplary flow chart for a base station to handle the uplink channel occupies a set of uplink resource elements that are different from the downlink resource elements in accordance with embodiments of the current invention. At step S301 the base station receives a first uplink channel carrying first information bits from a first user equipment (UE) on a first set of uplink resource elements, each has a first uplink frequency domain subcarrier spacing and a first uplink time domain symbol duration. At step S302, the base station receives a second uplink channel carrying second information bits from a second UE on a second set of uplink resource elements, wherein each uplink resource element in the second set has a second uplink frequency domain subcarrier spacing different from the first uplink frequency domain subcarrier spacing and a second uplink time domain symbol duration different from the first uplink time domain symbol duration.

Figure 24:
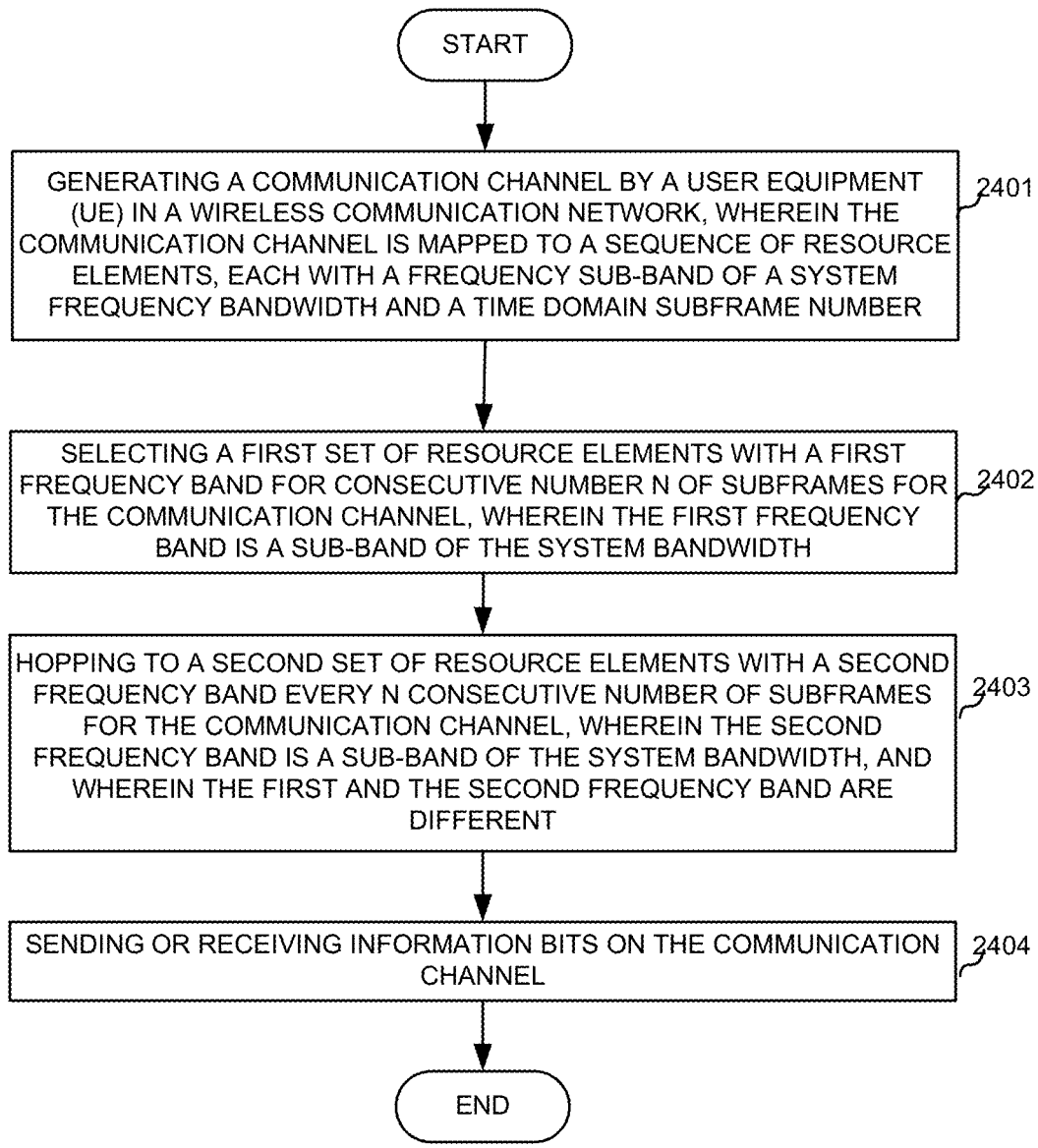
FIG. 24 shows an exemplary flow chart for a UE to perform frequency hopping for narrowband configuration in accordance with embodiments of the current invention.

FIG. 24 shows an exemplary flow chart for a UE to perform frequency hopping for narrowband configuration in accordance with embodiments of the current invention. At step S401, the UE generates a communication channel in a wireless communication network, wherein the communication channel is mapped to a sequence of resource elements, each with a frequency sub-band of a system frequency bandwidth and a time domain subframe number. At step S402, the UE selects a first set of resource elements with a first frequency band for consecutive number N of subframes for the communication channel, wherein the first frequency band is a sub-band of the system bandwidth. At step S403, the UE hops to a second set of resource elements with a second frequency band every N consecutive number of subframes for the communication channel, wherein the second frequency band is a sub-band of the system bandwidth, and wherein the first and the second frequency band are different. At step S404, the UE sends or receives information bits on the communication channel.

Figure 25:
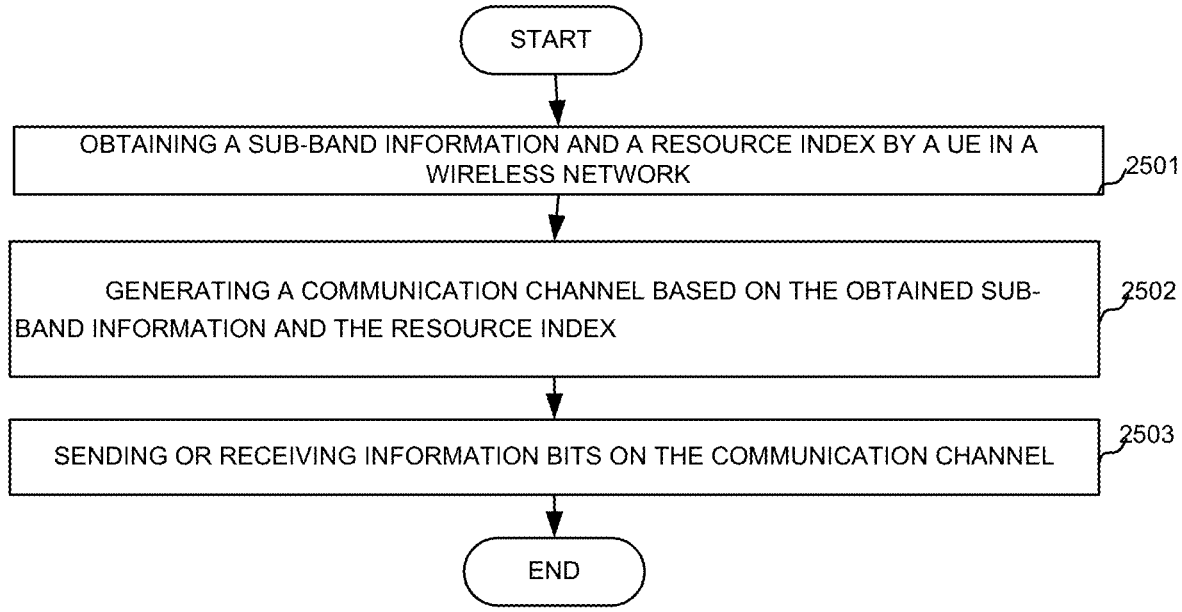
FIG. 25 shows an exemplary flow chart for a UE to perform resource allocation for narrowband configuration in accordance with embodiments of the current invention.

FIG. 25 shows an exemplary flow chart for a UE to perform resource allocation for narrowband configuration in accordance with embodiments of the current invention. At step S501, the UE obtains sub-band information and a resource index. At step S502, the UE generates a communication channel based on the obtained sub-band information and the resource index. At step S503, the UE sends or receives information bits on the communication channel.

Figure 26:
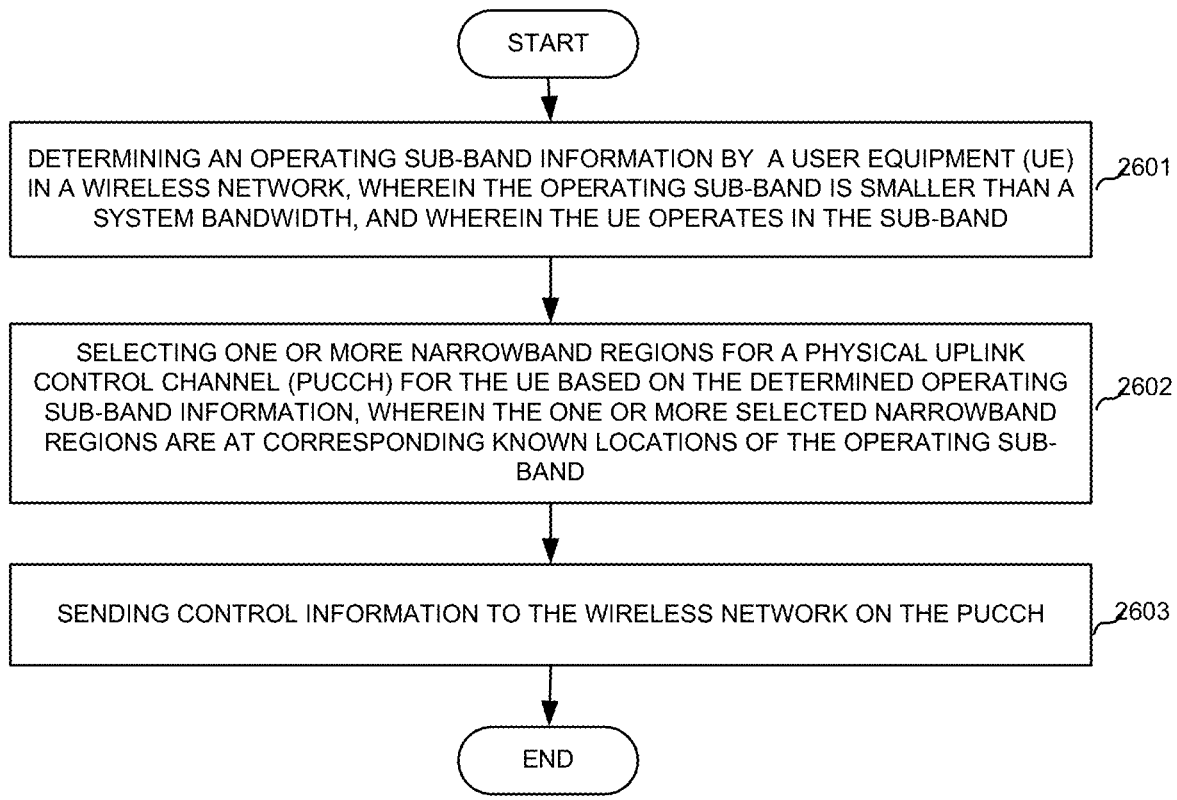
FIG. 26 shows an exemplary flow chart for a UE to perform PUCCH selection for narrowband configuration in accordance with embodiments of the current invention.

FIG. 26 shows an exemplary flow chart for a UE to perform PUCCH selection for narrowband configuration in accordance with embodiments of the current invention. At step S601, the UE determines an operating sub-band information in a wireless network, wherein the operating sub-band is smaller than a system bandwidth, and wherein the UE operates in the sub-band. At step S602, the UE selects one or more narrowband regions for a physical uplink control channel (PUCCH) for the UE based on the determined operating sub-band information, wherein the one or more selected narrowband regions are at corresponding known locations of the operating sub-band. At step S603, the UE sends control information to the wireless network on the PUCCH.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Time Division Synchronous Code Division Multiple Access (TD-SCDMA), Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, TD-SCDMA, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

The invention claimed is:
1. A method, comprising:
determining an operating sub-band information by a user equipment (UE) in a wireless network, wherein the operating sub-band is smaller than a system bandwidth, and wherein the UE operates in the sub-band;
selecting one or more narrowband regions for a physical uplink control channel (PUCCH) for the UE based on the determined operating sub-band information, wherein the one or more selected narrowband regions are at corresponding known locations of the operating sub-band, and wherein resource blocks of the selected one or more narrowband regions occupy different frequency bands; and
sending control information to the wireless network on the PUCCH.
2. The method of claim 1, wherein the selected one or more narrowband regions are at one or two edges of the operating sub-band of the UE.
3. The method of claim 1, wherein the PUCCH stays on a same frequency band for a consecutive number N of subframes before hopping to a different frequency.
4. The method of claim 3, wherein one or more subframes in the selected narrowband regions are guard subframes.
5. The method of claim 4, wherein the guard subframes are at least based on a frequency re-tuning time of the UE.
6. A user equipment (UE), comprising:
a controller, configured to perform operations comprising:

determining an operating sub-band information in a wireless network, wherein the operating sub-band is smaller than a system bandwidth, and wherein the UE operates in the sub-band;

selecting one or more narrowband regions for a physical uplink control channel (PUCCH) for the UE based on the determined operating sub-band information, wherein the one or more selected narrowband regions are at corresponding known locations of the operating sub-band, and wherein resource blocks of the selected one or more narrowband regions occupy different frequency bands; and a transceiver, configured to send control information to the wireless network on the PUCCH.

7. The UE of claim 6, wherein the selected one or more narrowband regions are at one or two edges of the operating sub-band of the UE.

8. The UE of claim 6, wherein the PUCCH stays on a same frequency band for a consecutive number N of subframes before hopping to a different frequency.

9. The UE of claim 8, wherein one or more subframes in the selected narrowband regions are guard subframes.

10. The UE of claim 9, wherein the guard subframes are at least based on a frequency re-tuning time of the UE.

* * * * *